United States Patent
Kaishita et al.

(10) Patent No.: US 7,224,591 B2
(45) Date of Patent: May 29, 2007

(54) CHARGE PUMP DC/DC CONVERTER CIRCUIT

(75) Inventors: Kenji Kaishita, Tenri (JP); Hiroki Doi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/360,484

(22) Filed: Feb. 24, 2006

(65) Prior Publication Data

US 2006/0193156 A1  Aug. 31, 2006

(30) Foreign Application Priority Data

Feb. 24, 2005 (JP) ............................. 2005-049656
Feb. 20, 2006 (JP) ............................. 2006-043057

(51) Int. Cl.
*H02M 3/07* (2006.01)
*H02M 3/18* (2006.01)

(52) U.S. Cl. .................... 363/60; 327/536; 307/110

(58) Field of Classification Search ................ 363/59, 363/60; 327/536; 307/110

See application file for complete search history.

(56) References Cited

U.S. PATENT DOCUMENTS

| 6,556,064 | B1 * | 4/2003 | Yatabe ...................... 32/536 |
| 6,738,271 | B2 * | 5/2004 | Umeda ...................... 363/60 |
| 6,809,433 | B2 * | 10/2004 | Nozu ........................ 307/109 |

FOREIGN PATENT DOCUMENTS

JP  10-014218  1/1998

* cited by examiner

*Primary Examiner*—Gary L Laxton
(74) *Attorney, Agent, or Firm*—Harness, Dickey & Pierce, P.L.C.

(57) ABSTRACT

A charge pump DC/DC converter circuit of the present invention includes: a monitor circuit that detects a potential difference between terminals of a semiconductor switch that turns on during a first period, so as to output a determining signal corresponding to the potential difference; and each of drive circuits that outputs a drive signal to a semiconductor switch that turns on during a first period, in response to the determining signal. The drive signal increases the on-resistance of the semiconductor switch in proportion to the detected potential difference.

17 Claims, 21 Drawing Sheets

CHARGE PUMP DC/DC CONVERTER CIRCUIT

This Nonprovisional application claims priority under 35 U.S.C. § 119(a) on Patent Application No. 049656/2005 filed in Japan on Feb. 24, 2005 and Patent Application No. 043057/2006 filed in Japan on Feb. 20, 2006, the entire contents of which are hereby incorporated by reference.

FIELD OF THE INVENTION

The present invention relates to a DC/DC converter circuit that converts a direct current to a predetermined direct current, and particularly relates to a charge pump DC/DC converter circuit.

BACKGROUND OF THE INVENTION

An example of a conventional charge pump DC/DC converter circuit is shown in FIG. 34. This circuit is a double step-up charge pump circuit that outputs a voltage twice as much as a power source voltage Vin. As shown in the figure, the DC/DC converter includes a charge pump SW circuit 55, drive circuits 51–54, step-up capacitor C51, and an output capacitor C52. The charge pump SW circuit 55 is made of semiconductor switches Q51–Q54 each being a MOS transistor. The transistors Q51–Q54 are turned on and off by the respective drive circuits 51–54. The drive circuits 51–54 are controlled by externally-supplied signals 51a–54a, respectively. It is noted that "SW" indicates a switch, unless otherwise stated.

When the charge pump performs the step-up, the following two operations (i) and (ii) are repeated: (i) the semiconductor switches Q52 and Q54 are turned on while the switches Q51 and Q53 are turned off, so that the capacitor C51 is charged up to the power source voltage Vin, and (ii) the switches Q51 and Q53 are turned on while the switches Q52 and Q54 are turned off, so that the capacitor C52 is charged up to a voltage which is the sum of the voltage of the capacitor C51 and the power source voltage Vin, and as a result an output voltage is obtained.

The above-described conventional DC/DC converter circuit is disadvantageous in that a rush current or a peak current flows when the step-up operation is carried out while the capacitors C51 or C52 is not sufficiently charged, thereby exerting an adverse effect on other devices.

The details of the above will be given. A charge pump circuit 5 includes a charge pump SW circuit 55 and drive circuits 51–54. In accordance with signals supplied to the drive circuits, the drive circuits drive the charge pump SW circuit 55.

FIG. 34 shows a circuit which is generally termed "doubler". This doubler includes two capacitors (C51 and C52) and fours switches (Q51, Q52, Q53, and Q54). The doubler is switched between two states.

In one state, the output voltages of the drive circuits 51, 53, and 54 are at H (high) level, while the output voltage of the drive circuit 52 is at L (Low) level. Also, the switches Q51 and Q53 are turned off while the switches Q52 and Q54 are turned on, so that the capacitor C51 is charged. In this state, the capacitor C51 is charged up to the power source voltage Vin.

In the other state, the levels of the output voltages of the respective drive circuits are inverted. That is, the output voltages of the drive circuits 51, 53, and 54 are at L (Low) level, while the output voltage of the drive circuit 52 is at H (High) level. Also, the switches Q51 and Q53 are turned on while the switches Q52 and Q54 are turned off. As a result, the capacitor C52 is charged up to the sum of the voltage of the C51 and the power source voltage Vin.

The aforesaid two states are repeatedly alternated so that the resultant output voltage is twice as high as the power source voltage Vin.

In FIG. 34, in a case where (i) the capacitor C51 in the early stage of operation has not have sufficient electric charges, (ii) the switches Q51 and Q53 are turned off and (iii) the switches Q52 and Q4 are turned on, the power source voltage Vin is connected with the capacitor C51. As a result, an extremely large charging current flows. Such an extremely large current that flows in the early stage of operation is termed rush current.

Meanwhile, assume that the switches Q51 and Q53 are turned on and the switches Q52 and Q54 are turned off, while either the capacitor C52 in the early stage of operation has not had sufficient electric charges or the accumulated electric charges in the capacitor C52 are discharged on account of the load fluctuation and hence the output voltage decreases. In such a case, the capacitors C51 and C52 are connected to each other. As a result, an extremely high peak current flows.

Since the charge pump circuit is a power source circuit, the output terminal thereof is connected to another circuit. Also, the primary source side (Vin) of the charge pump circuit is connected to another circuit.

In a case where the aforesaid circuits commonly use the same power source Vin, the voltage Vin may decrease on account of wire resistance influenced by the rush current and peak current, thereby causing malfunction of the circuit. Furthermore, if a current larger than a permissible amount of the wire flows, the wire for the power source may break down.

As means for resolving the adverse effects on connected devices on account of the rush current, a circuit shown in FIG. 35 has been proposed (Japanese Laid-Open Patent Application No. 10-014218 (published on Jan. 16, 1998)).

The circuit shown in FIG. 35 is provided with a circuit 64 that detects a voltage of the step-up capacitor C61 and a gate drive voltage varying circuit (made up of members 62, 64, and 65) controlling the gate voltage of the capacitor C61, which connects/disconnects the power supply side to/from the step-up capacitor C61. When the voltage of the capacitor C61 is high, the gate voltage is increased so that the on-resistance of the capacitor C61 is decreased. Meanwhile, when the voltage of the capacitor C61 is low, the on-resistance of the capacitor C61 is increased so that a charging current flowing into the capacitor C61 is restrained. In this manner, the aforesaid problem is resolved.

However, assume that (i) the capacitors C61 and C63 are turned off while the switches 67 and 68 are turned on so that the capacitors C61 and C62 are connected to each other, and (ii) the capacitor C62 is not sufficiently charged. In this case, a peak current flowing from the capacitor C61 to the capacitor C62 may be generated. Moreover, it is necessary to incorporate, into the SW circuit of the charge pump, the gate drive voltage varying circuit (made up of members 62, 64, and 65), which controls the gate voltage of a transistor 61 which connects/disconnects the power supply side to/from the step-up capacitor C61. Furthermore, since the gate drive voltage is controlled by a control signal OSC of the charge pump, it is necessary to pay close attention to the arrangement of the gate drive voltage varying circuit (made up of members 62, 64, and 65) and the cycle of the control signal OSC.

SUMMARY OF THE INVENTION

The present invention was done to solve the above-identified problem. The objective of the present invention is to provide a charge pump DC/DC converter in which a rush current and peak current, which are generated when a charge current is supplied even through a step-up capacitor or an output capacitor is not sufficiently charged, are reduced even if a conventional control method is used.

To achieve the objective above, a charge pump DC/DC converter circuit, in which, in a first period of charge pump, a first-stage capacitor is charged up to a power supply voltage by turning on first semiconductor switches on a charging path to the first-stage capacitor, and in a second period, of the charge pump, which is subsequent to the first period, a second-stage capacitor is charged up to a voltage which is sum of a voltage of the first-stage capacitor thus charged and the power supply voltage, by turning on second semiconductor switches on a charging path to the second-stage capacitor, so that a voltage of a last-stage capacitor is outputted as an output voltage, includes: a first monitor circuit which detects a potential difference between terminals of one of the first semiconductor switches turning on in the first period, so as to output a first determining signal corresponding to the detected potential difference; and a first drive circuit which outputs a drive signal to at least one of the first semiconductor switches in response to the first determining signal, the drive signal increasing on-resistance of at least one of the first semiconductor switches in proportion to the detected potential difference.

According to this arrangement, a potential difference between terminals of one of the first semiconductor switches being turned on in the first period is detected, and a determining signal corresponding to the potential difference is outputted. In accordance with the determining signal, a drive signal is supplied to the semiconductor switches being turned on in the first period. This drive signal increases the on-resistances of these semiconductor switches, in proportion to the detected potential difference.

As a result, the on-resistances of the semiconductor switches being turned on in the first period increase as the aforesaid potential difference increases, and hence currents flowing into the semiconductor switches are restrained.

In a case where the capacitors are two-staged, the first-stage capacitor and the second-stage capacitor are regarded as the first stage and the last stage, respectively, and these capacitors may correspond to a step-up capacitor and an output capacitor, respectively.

Therefore, the more the rush current and peak current are likely to occur, the more the restraint of such currents is carried out effectively. Moreover, a conventional arrangement of semiconductor switches is usable.

For the reasons above, a rush current and peak current, which are generated when a charge current is supplied even through a step-up capacitor or an output capacitor is not sufficiently charged, are reduced even if a conventional control method is used.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

The present embodiment illustrates a DC/DC converter that performs the step-up using a charge pump. This DC/DC converter is used for stepping up a power supply voltage Vin in, for example, a small electronic device. This converter controls a pulsed voltage applied to a capacitor. On this account, a large current instantly flows at the time of, for example, the pulse rise or fall, in a case where the voltage of the output capacitor decreases either in the initial state (e.g. power-on) or on account of load fluctuation. This may cause crashing of the system. It is noted that conventional arts provide an initial standby state for a period immediately after the power-on. The charge pump starts after this initial standby state. The present embodiment prevents an extremely large current termed rush current or peak current from flowing at the time of the charge pump.

Figure 1:
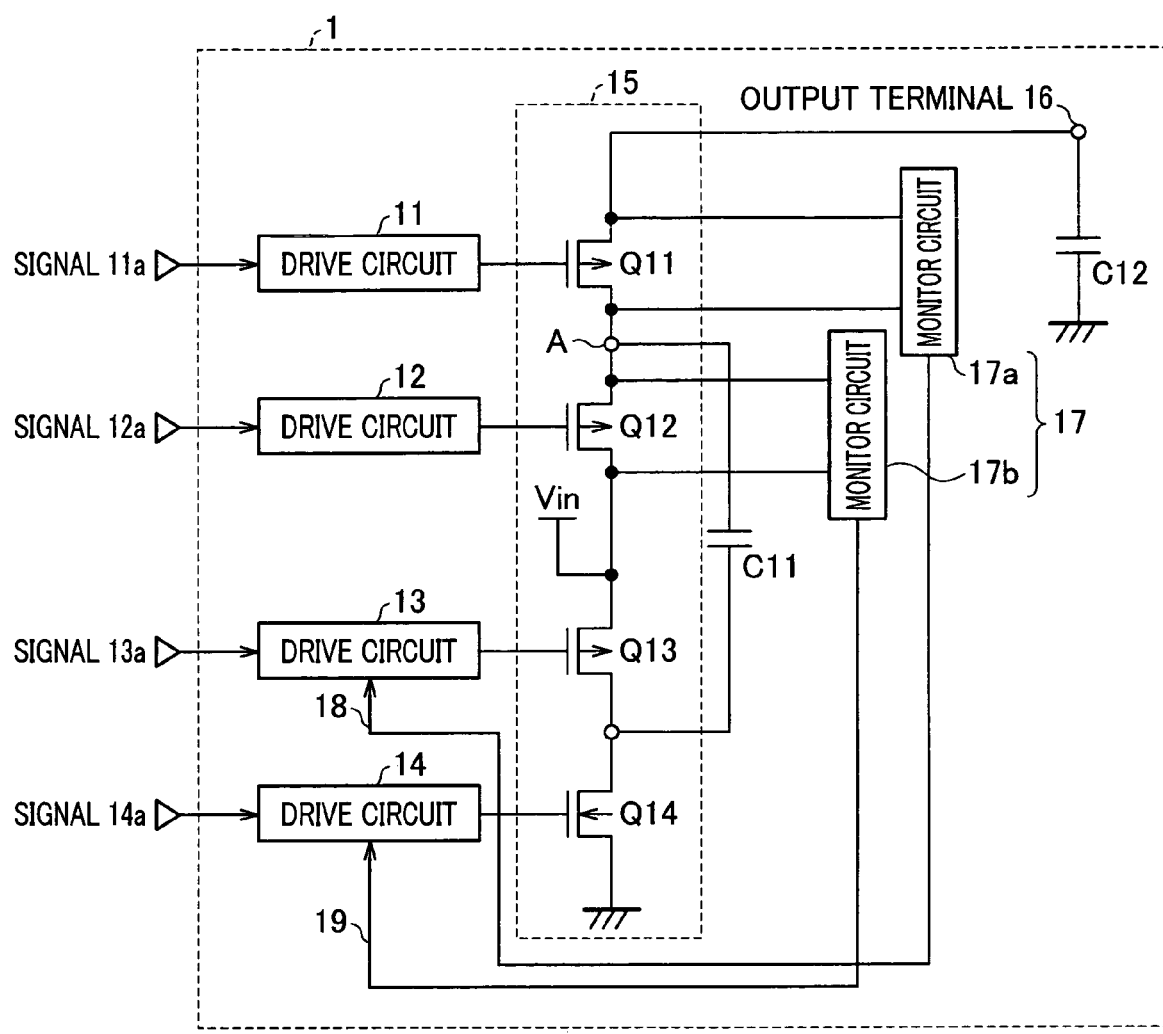
FIG. 1 is a block diagram showing an example of a charge pump DC/DC converter of Embodiment 1.

As shown in FIG. 1, a charge pump circuit 1 (charge pump DC/DC converter) includes a charge pump SW circuit 15, drive circuits 11–14, and a monitor circuit 17 that monitors currents flowing in semiconductor switches Q11 and Q12 so as to supply determining signals (determination voltages) 18 and 19 to the drive circuits 13 and 14, respectively. Indicated by C11 is a step-up capacitor (first-stage capacitor) charged with a power source voltage Vin. Indicated by C12 is a smoothing capacitor, and is an output capacitor (second-stage capacitor) charged with a voltage stepped up by the voltage of the capacitor C11 and the power source voltage Vin.

Figure 34:
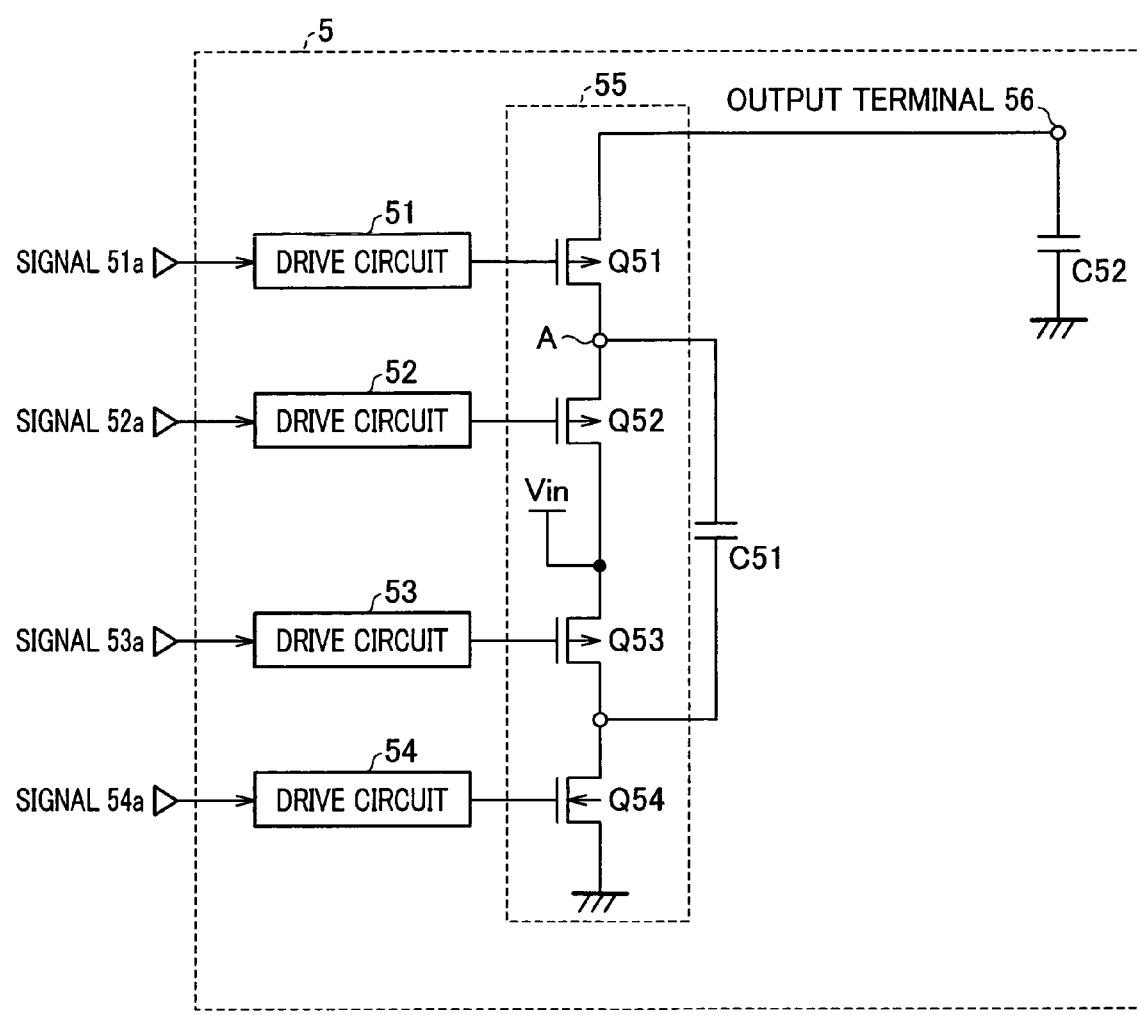
FIG. 34 is a block diagram of an example of a conventional charge pump DC/DC converter.
Figure 35:
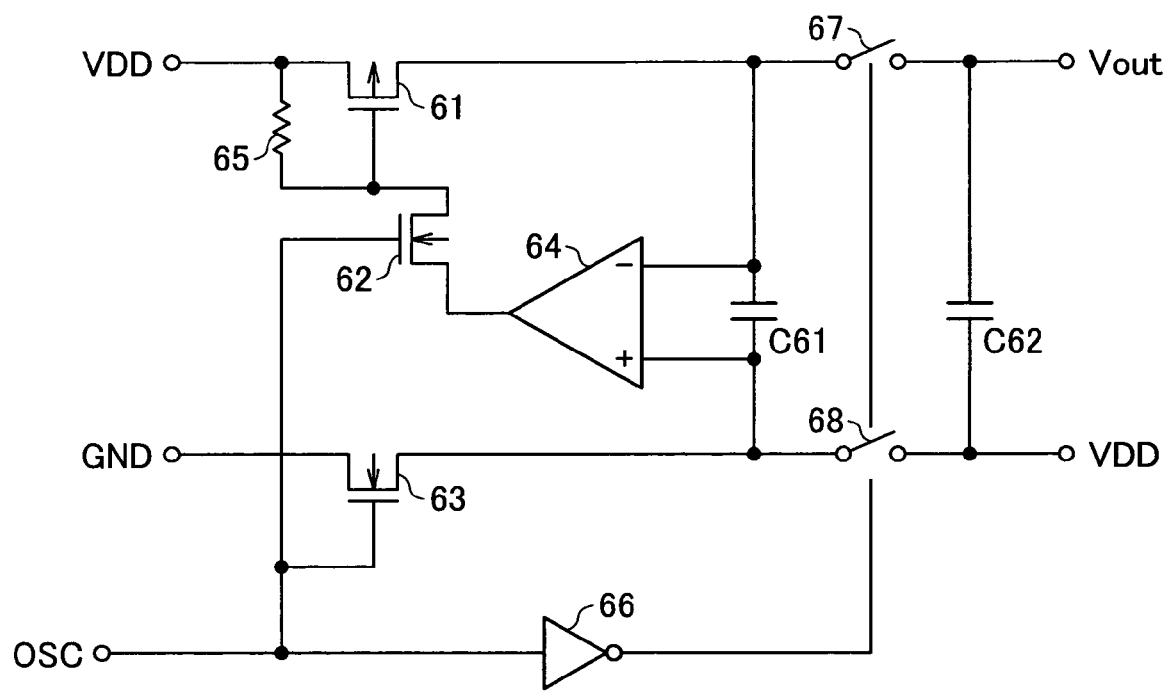
FIG. 35 is a circuit diagram of an example of the conventional charge pump DC/DC converter.

The charge pump SW circuit 15 includes semiconductor switches Q11–Q14 (first and second semiconductor switches) that are made up of MOS transistors and identical with the switches Q51–Q54 shown in FIG. 34. In the charge pump SW circuit 15, how the switching is carried out and in what manner the capacitors C11 and C12 are charged on account of the switching are identical with those described in Background of the Invention, and hence the descriptions on the switching and charging in the charge pump SW circuit 15 are omitted.

Figure 2:
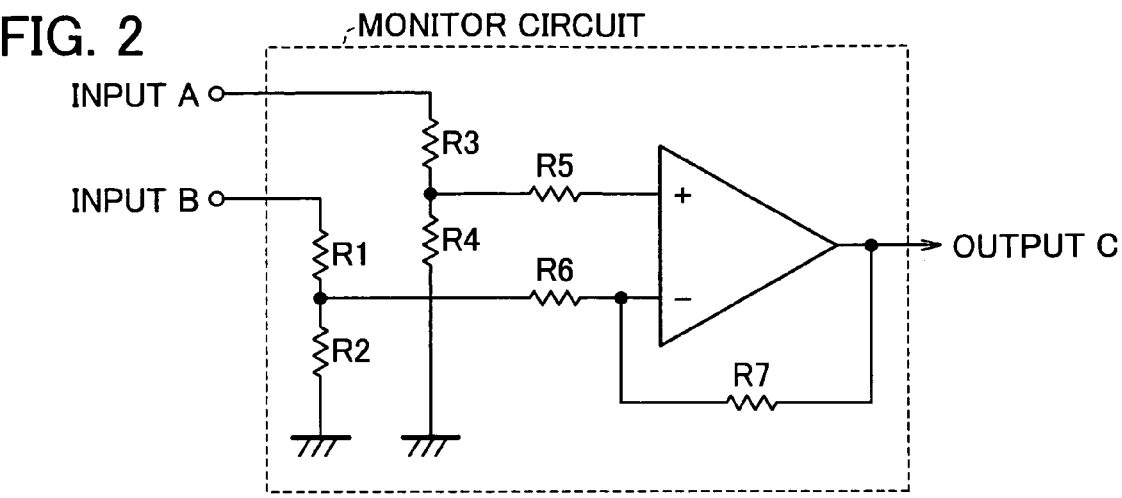
FIG. 2 is a circuit diagram of an example of a monitor circuit.

The monitor circuit 17 monitors currents flowing into transistors. The monitor circuit 17 is made up of a monitor circuit 17a (second monitor circuit) and a monitor circuit 17b (first monitor circuit), and each of which is arranged as shown in FIG. 2. At the time of charging the step-up capacitor C11 up to the power source voltage Vin, the monitor circuit 17b measures a potential difference between the terminals of the switch Q12, and supplies a signal 19 (first determining signal) to the drive circuit 14 (fist drive circuit) in such a manner as to vary the on-resistance of the switch Q14 in accordance with the difference between the measured potential difference and a preset voltage. Meanwhile, at the time of charging the output capacitor C12 up to a voltage which is the sum of the voltage of the step-up capacitor C11 and the power supply voltage Vin, the monitor circuit 17a supplies a determining signal 18 (second determining signal) to the drive circuit 13 (second drive circuit) in such a manner as to vary the on-resistance of the switch Q13 in accordance with the difference between (i) a potential difference between the terminals of the switch Q11 and (ii) a preset voltage.

In the present embodiment, the current of the upper capacitor in FIG. 1 is monitored so that the drive signal of the lower capacitor is controlled. The other way around is possible in principle, yet the method (arrangement) shown in FIG. 1 is practical for achieving the step-up using the charge pump as shown in the present embodiment.

As to the switch control signals, an input signal (hereinafter, simply referred to as signal) 11a is paired with a signal 13a (i.e. Q11 and Q13), while a signal 12a is paired with a signal 14a (i.e. Q12 and Q14). The signals 11a, 13a, and 14a are in reverse phase with the signal 12a. The signals 11a, 13a, and 14a may be clock signals. The signal 12a may be an inversion signal of the clock signal.

As described above, the present embodiment relates to a charge pump DC/DC converter which uses MOS transistors as semiconductor switches and steps up a voltage using the semiconductor switches and capacitors. The charge pump DC/DC converter includes (i) a monitor circuit which detects a potential difference between the terminals of a semiconductor switch that connects/disconnects the power source and the step-up capacitor, at the time of charging the step-up capacitor up to a power supply voltage, so as to supply a determining signal to a drive circuit of a semiconductor switch that connects/disconnects the step-up capacitor and GND, and (ii) a monitor circuit that detects a potential difference between the terminals of a semiconductor switch that connects/disconnects the step-up capacitor, and an output capacitor, at the time of charging the output capacitor up to a voltage which is the sum of the voltage of the step-up capacitor and the power supply voltage, so as to supply a determining signal to a drive circuit of a semiconductor switch for the connection/disconnection between the power source to the step-up capacitor. In a case where the potential difference detected by the monitor circuit is higher than a preset voltage, the on-resistance of the switch connected to the capacitor is controlled by the drive circuit to which a determining signal is supplied. With this, a rush current or peak current is restrained during the charge pump.

In the present embodiment, two switches (transistors) influence, as a pair, on a capacitor and have respective drive circuits. While a current flowing in one switch is monitored, a drive voltage of the other switch is controlled in accordance with the monitored current. Two pairs of switches are provided in the present embodiment, in order to deal with control signals operating in reverse phases. The total number of switches is therefore four, and in each pair one of the switches is monitored while the other one of the switches is subjected to level-control.

FIG. 2 shows an example of the monitor circuit. An input A and an input B are connected to respective terminals of a semiconductor switch, and a potential difference is outputted to an output C. Since the input impedance is far larger than the on-resistance of the semiconductor switch, a current rarely flows from the step-up circuit (charge pump circuit) to the monitor circuit.

The output C of the monitor circuit shown in FIG. 2 is the determining signal 18 or 19. As signals 18 and 19 shown in FIGS. 12 and 13 (discussed later) indicate, the output C increases in proportion to the potential difference between the inputs A and B, and the increase in the output C increases the on-resistance of the semiconductor switch which is the target of control. On the other hand, the output C decreases as the potential difference between the inputs A and B decreases. The output C decreases to zero at the end, causing the on-resistance to be zero. The potential difference between the inputs A and B on this occasion is the preset voltage. In other words, the output C is larger than zero when the potential difference between the inputs A and B is larger than the preset voltage, and hence the on-resistance of the semiconductor switch which is the target of control increases accordingly. The preset voltage may be zero or more, and can be optionally determined by setting resistors R1–R7 in the course of manufacture.

In the present case, the output C decreases to zero in the end. The output C may be more than zero (i.e. the on-resistance may be more than zero) in the end.

In actual products, the resistors R1–R7 may be set so that the output C is as high as (or lower than) a voltage of the signal 13a or 14a at High level when the potential difference between the inputs A and B is largest.

Figure 3:
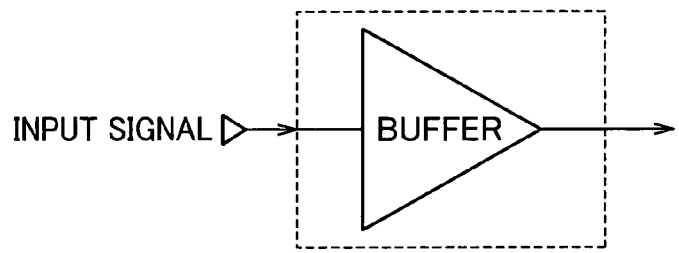
FIG. 3 is a block diagram of an example of a drive circuit.

As shown in FIG. 3, the drive circuit 11 is a buffer circuit that improves a driving capability of a semiconductor control signal. The drive circuit improves the driving capability of an externally-supplied clock signal, so as to drive the semiconductor switch.

The drive circuit 12 is identical with the drive circuit 11.

Figure 4:
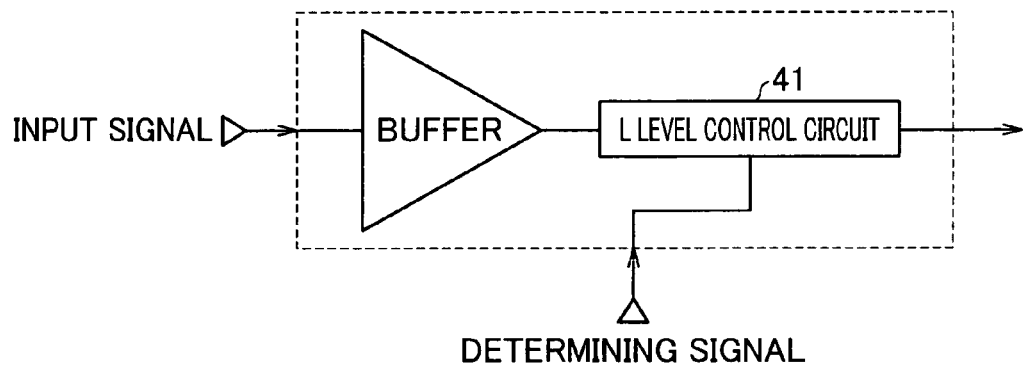
FIG. 4 is a block diagram of an example of a drive circuit.

As shown in FIG. 4, the drive circuit 13 is identical with the drive circuit 11 except that a L (Low) level control circuit 41 is additionally provided. In this drive circuit 13, the L-level of the output is adjusted by the determining signal 18 of the monitor circuit 17. On this account, the on-resistance of the semiconductor switch Q13 is controlled so that a rush current is restrained.

Figure 5:
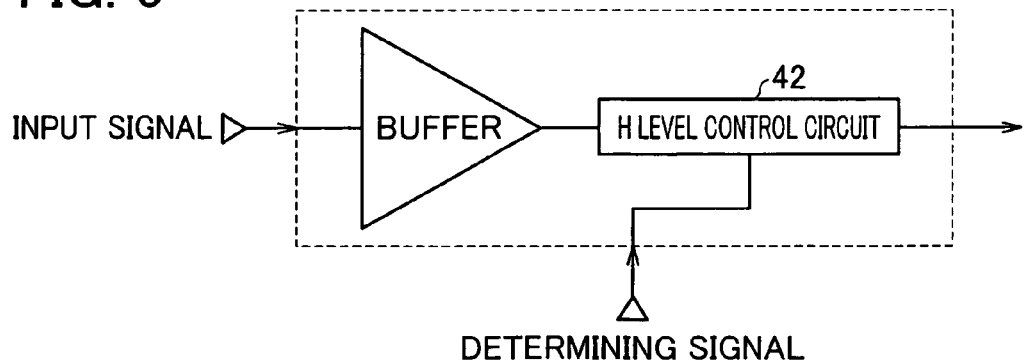
FIG. 5 is a block diagram of an example of a drive circuit.

As shown in FIG. 5, the drive circuit 14 is identical with the drive circuit 11 except that a H (High) level control circuit 42 is additionally provided. In this drive circuit 14, the H level of the output is adjusted by the determining signal 19 of the monitor circuit 17. On this account, the on-resistance of the semiconductor switch Q14 is controlled, so that a rush current is restrained.

Because of the addition of the monitor circuit 17 and the addition of the level control circuits to the respective drive circuits 13 and 14, a rush current restraining capability is imparted to currently-used charge pump DC/DC converters.

Figure 6:
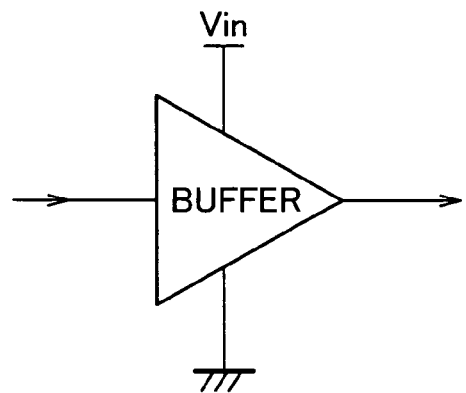
FIG. 6 is a block diagram of an example of a buffer circuit.
Figure 7:
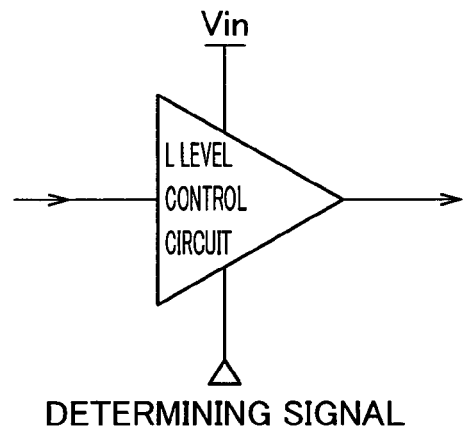
FIG. 7 is a block diagram of an example of a L level control circuit.
Figure 8:
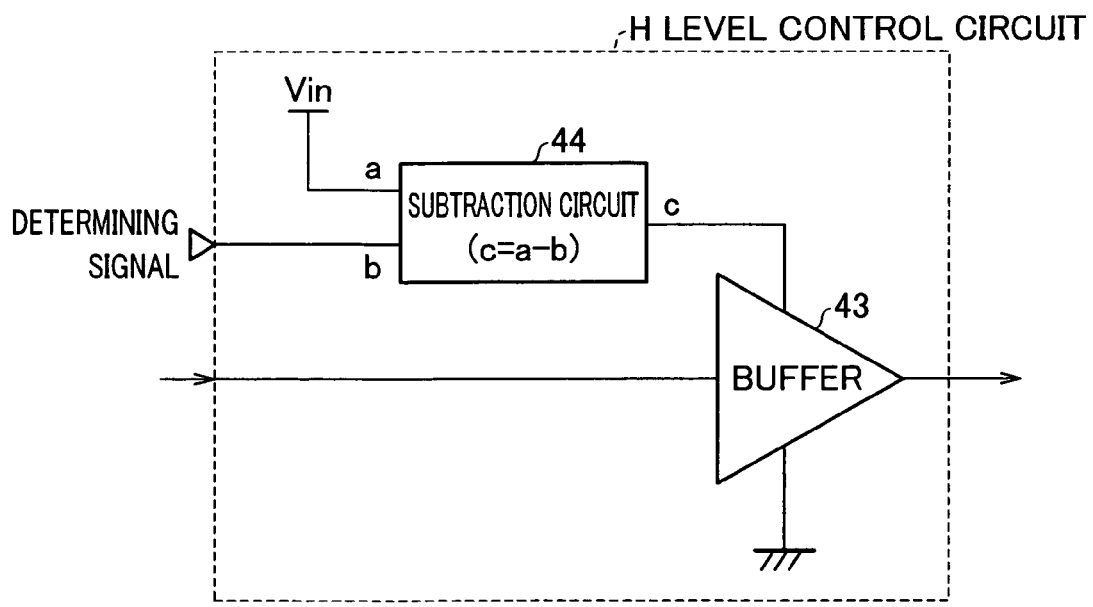
FIG. 8 is a block diagram of an example of a H level control circuit.

The L level control circuit 41 and the H level control circuit 42 are identical with a buffer circuit in terms of structure, and hence the difference between the circuits lies in the power source voltage or the ground voltage. That is, as shown in FIG. 6, the buffer circuit outputs, as the H level, the power supply voltage Vin, and the buffer circuit outputs GND as the L level. As shown in FIG. 7, the L level control circuit outputs the power supply voltage Vin as the H level. Also, as the L level, the L level control circuit replaces the GND of the buffer circuit with the determining signal 18, and hence the L level varies in accordance with the determining signal 18. As shown in FIG. 8, the H level control circuit includes a buffer 43 and a subtraction circuit 44 that subtracts the determining signal 19 from the power supply voltage Vin. The output from the subtraction circuit 44 is supplied, as a power source, to the buffer 43 The H level therefore varies.

Figure 9:
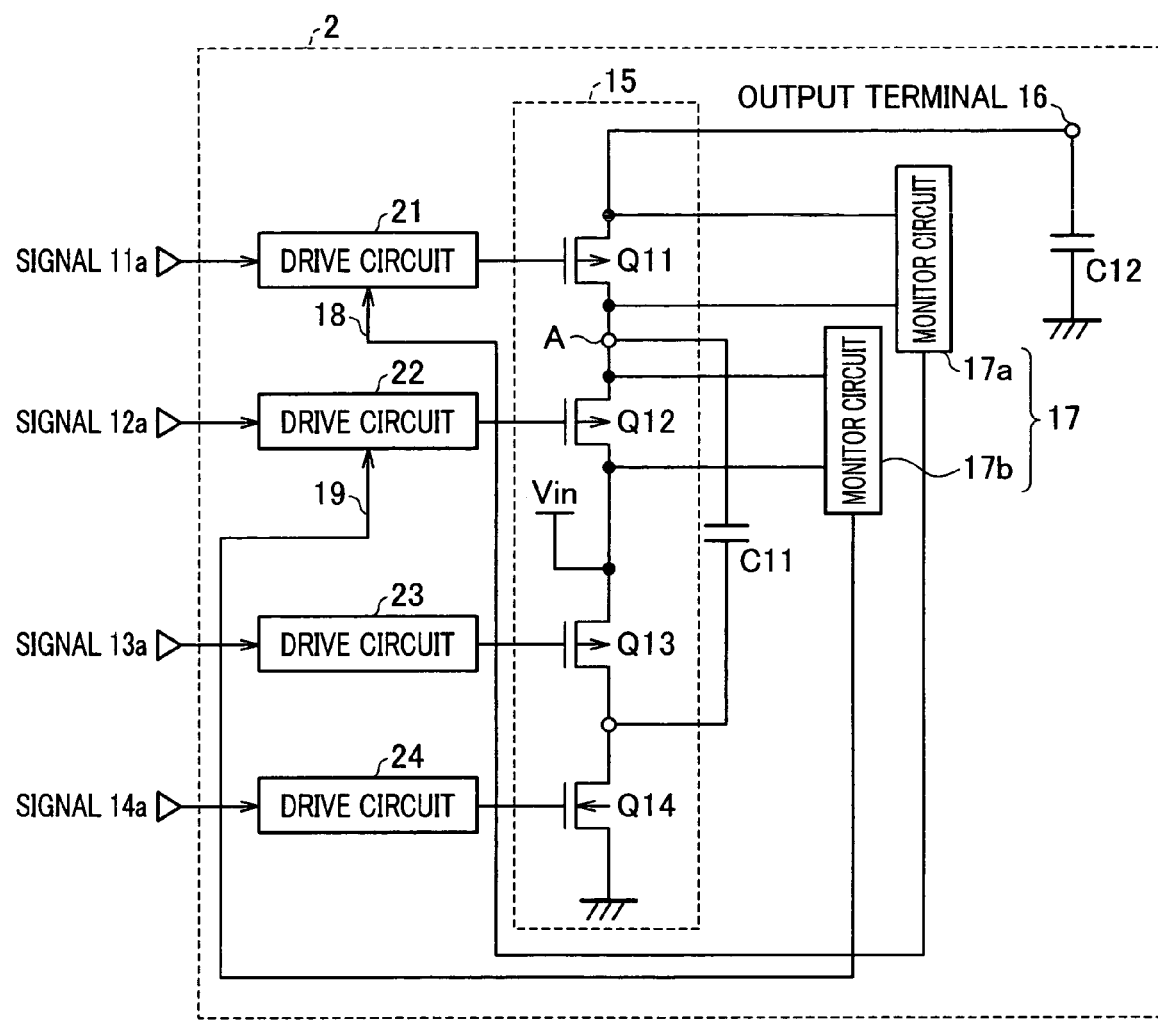
FIG. 9 is a block diagram of an example of the charge pump DC/DC converter of Embodiment 1.

As in a charge pump circuit 2 (charge pump DC/DC converter) shown in FIG. 9, switches (Q11 and Q12) whose potential difference is detected by the monitor circuit may be identical with switches each of which is turned on and off by a drive circuit output which varies in accordance with the determining signal. In this case, the drive circuits 21 and 22 (first drive circuits) are identical with those as shown in FIG. 4, and the drive circuits 23 and 24 are identical with those shown in FIG. 3.

Figure 10:
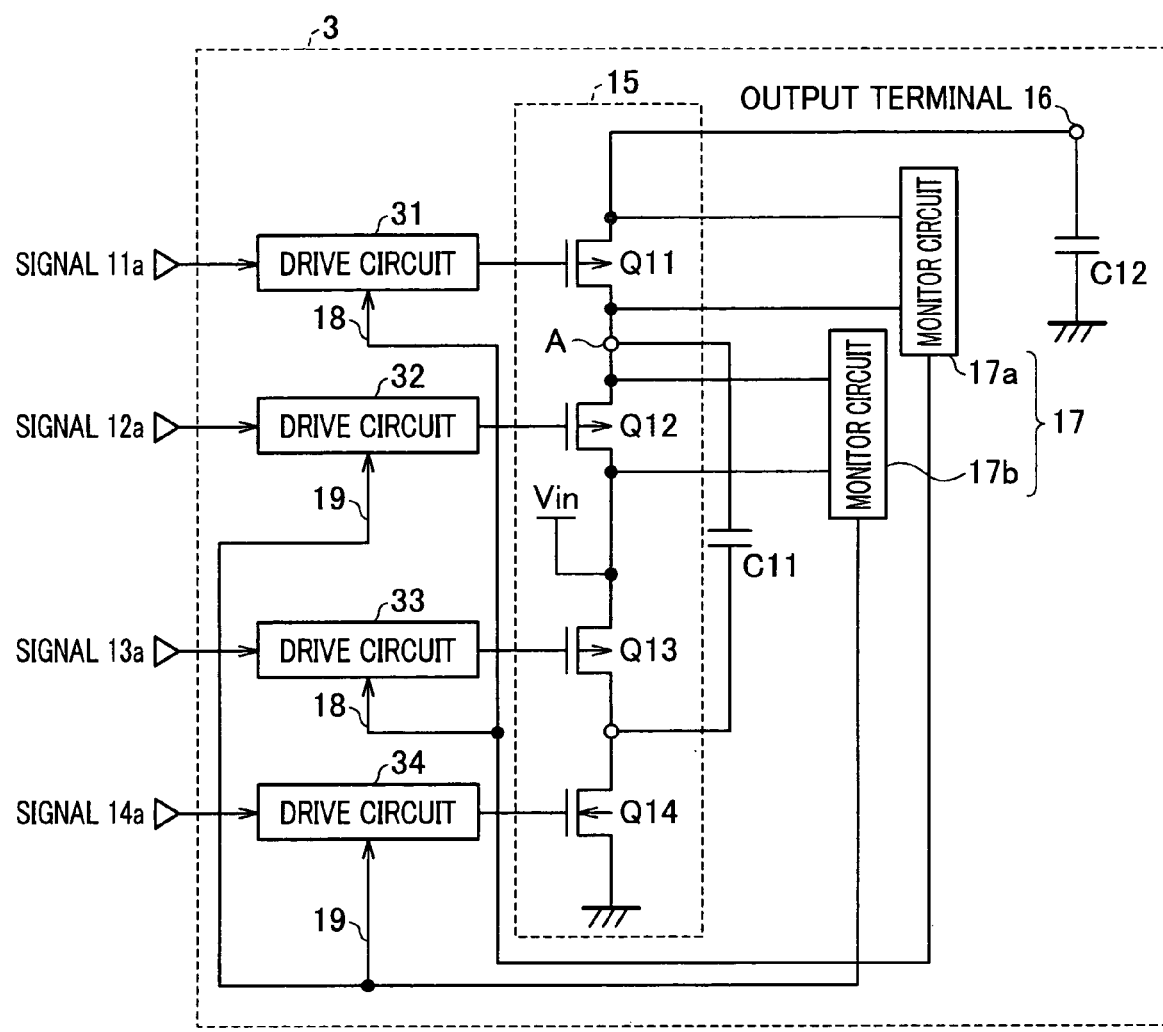
FIG. 10 is a block diagram of an example of the charge pump DC/DC converter of Embodiment 1.

Moreover, as in a charge pump circuit 3 (charge pump DC/DC converter) shown in FIG. 10, the on-resistances of the switches Q12 and Q14 may be controlled by the potential difference of the switch Q12. That is, the switches (Q11–Q14) that are turned on and off by drive circuit outputs that vary in accordance with determining signals include (i) those (Q11 and Q12) subjected to the potential difference measurement by the monitor circuit and (ii) those (Q13 and Q14) not subjected to the potential difference measurement by the monitor circuit. In this case, each of the drive circuits 31, 32, and 33 is arranged as shown in FIG. 4, while the drive circuit 34 is arranged as shown in FIG. 5.

Figure 11:
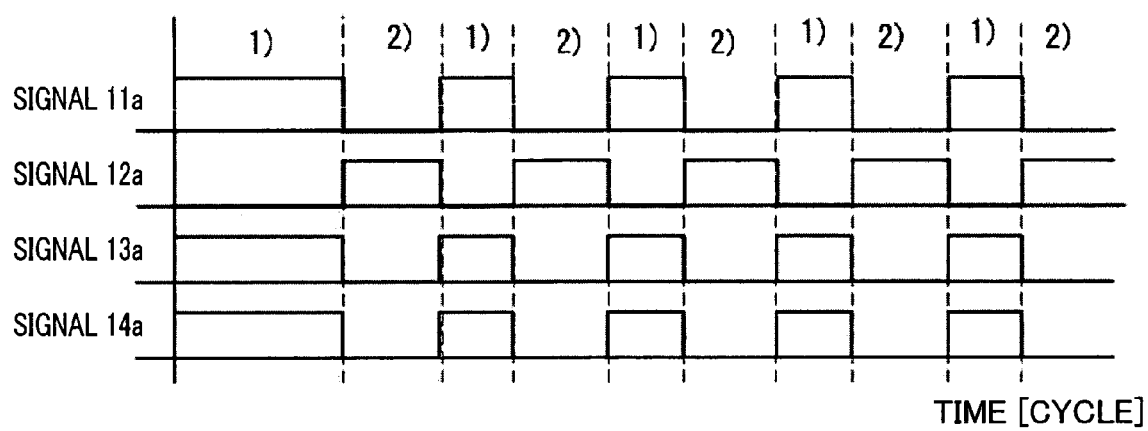
FIG. 11 shows waveforms of input signals.

The waveforms of the respective signals 11a–14a change between High and Low, as shown in FIG. 11. In the figure, an interval (first interval) marked "1)" is a period immediately before the commencement of the charge pump. The charge pump starts from the next interval (second interval). Each of the intervals after the first interval is divided into a first half (marked "2)") and a second half (marked "1)"). One interval corresponds to one cycle of the aforesaid clock signal.

In the intervals after the first interval, partial intervals 1) and 2) correspond to the timings of turning on or off the semiconductor switch to be controlled. In the partial intervals 1), the switches corresponding to the signals 11a, 12a, 13a, and 14a are turned off, on, off, and on, respectively. In the partial intervals 2), the switches corresponding to the signals 11a, 12a, 13a, and 14a are turned on, off, on, and off, respectively.

The output of the circuit shown in FIG. 1 is obtained by alternately repeating the following states 1) and 2):

1) A state where the step-up capacitor C11 is charged up to the power supply voltage Vin (first period): and 2) A state where the output capacitor C12 is charged up to a voltage which is the sum of the power supply voltage Vin and the voltage of the step-up capacitor C11 (second period).

Now, the following will describe how rush current repression at the time of the charge pump is carried out using the arrangement above.

Once the power supply voltage Vin is supplied, a current flows into the step-up capacitor C11 and the output capacitor C12, via a parasitic diode. Because of this, the output voltage increases close to the power supply voltage Vin. At this timing, a charging current flows from the power supply voltage Vin into the capacitors C11 and C12.

Assume that the step-up capacitor C11 is not sufficiently charged at the time of, for example, starting the charge pump. In this case, if the switches Q11 and Q13 are turned off while the switches Q12 and Q14 are turned on, the power supply voltage Vin is connected to the capacitor C11. As a result, an extremely large charging current flows, so that the potential difference between the terminals of the switch Q12 becomes large. This large potential difference is detected by the monitor circuit 17, and the determining signal 19 is supplied to the drive circuit 14. In accordance with the potential difference, the H level of the output of the H level control circuit 42 is changed, so that the on-resistance of the switch Q14 is changed. In this manner, the on-resistance of the switch Q14 is increased when the potential difference is larger than the preset voltage, so that a current flowing in the path is restrained and hence the rush current is restrained. As the capacitor C11 is charged, the potential difference between the terminals of the switch Q12 reduces, while the output voltage of the H level control circuit 42 increases. As a result the on-resistance of the switch Q14 decreases. When the potential difference between the terminals of the switch Q12 reduces so as to be equal to the preset voltage, the output voltage of the H level control circuit 42 is changed to H level and the on-resistance of the switch Q14 becomes substantially zero.

Subsequently, assume that the output capacitor C12 is not sufficiently charged. If the switches Q11 and Q13 are turned on while the switches Q12 and Q14 are turned off, the capacitor C12 is charged up to a voltage which is the sum of the voltage of the capacitor C11 and the power supply voltage Vin. For this reason, a significantly large charging current flows from the capacitor C11 to the capacitor C12. Because of this current, a potential difference between the terminals of the switch Q11 becomes large. This large potential difference is detected by the monitor circuit 17, and the determining signal 18 is supplied to the drive circuit 13. In accordance with the potential difference, the L level of the output of the L level control circuit 41 is changed so that the on-resistance of the switch Q13 is changed. In this manner, in a case where the potential difference is larger than the preset voltage, the on-resistance of the switch Q13 is increased so that a current flowing in the path is restrained, and as a result a rush current and a peak current are restrained. As the capacitor C12 is charged, the potential difference between the terminals of the switch Q11 is reduced. Meanwhile, the output voltage of the L level control circuit 41 is reduced. As a result, the on-resistance of the switch Q13 is reduced. When the potential difference between the terminals of the switch Q11 is reduced so as to be equal to the preset voltage, the output voltage of the L level control circuit 41 is changed to L level and the on-resistance of the switch Q13 is reduced to substantially zero.

In normal use, if the load on the charge pump output side varies and hence the output voltage decreases, the voltage of the output capacitor C12 having been charged decreases so that the output capacitor C12 starts to discharge. Therefore, as in the case where the capacitor C12 is not sufficiently charged, it is possible to restrain the peak current from the capacitor C11.

Figure 12:
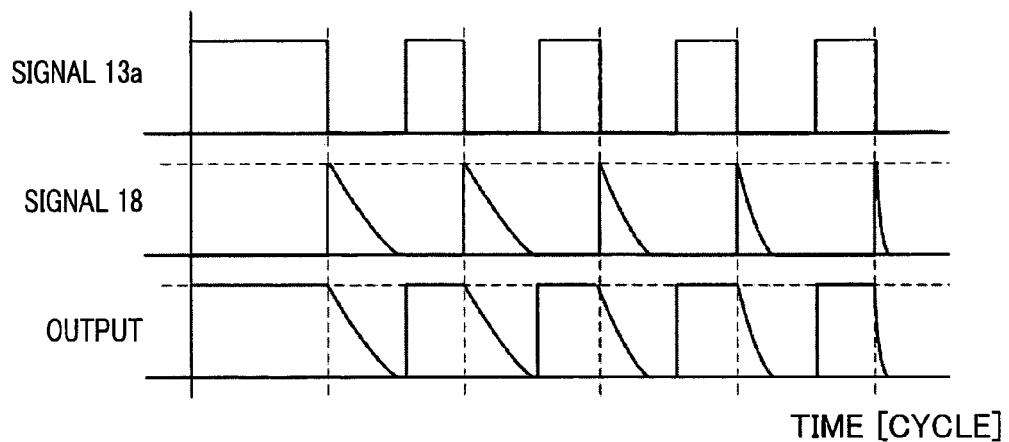
FIG. 12 shows waveforms of an input signal and a determining signal.

FIG. 12 shows an example of operating waveforms of the drive circuit 13 to which the L level control circuit 41 is added, as shown in FIG. 4. As FIG. 12 shows, the output of the drive circuit 13 is switched between High and Low in response to the signal 13a. The L level changes in accordance with the determining signal 18.

Vertical dotted lines in the figure divide time into five intervals, first interval to fifth interval. The first interval is immediately before the start of the charge pump. The charge pump starts from the next interval (second interval). In each of the intervals after the first interval, the first half corresponds to a period for charging the capacitor C12, and the second half corresponds to a period for charging the capacitor C11.

In the second interval and the following intervals, the rate of decrease of the signal 18 and the rate of decrease of the output of the drive circuit 13 become steep as time advances.

The L level of the output of the drive circuit 13 increases as the determining signal 18 increases. Also, the L level decreases as the determining signal 18 decreases.

The determining signal 18 is outputted from the monitor circuit 17a. As a comparison between the determining signal 18 and the potential difference ΔV11 of the switch Q11, the following equation holds true.

(determining signal 18)=kΔV11

In the equation above, k is an optionally-determinable coefficient. In the present example, k is a positive value.

If the potential difference ΔV11 of the switch Q11 is large, the L level of the output increases and the on-resistance of the switch Q13 also increases. On this account, a current flowing in the path is restrained.

Figure 13:
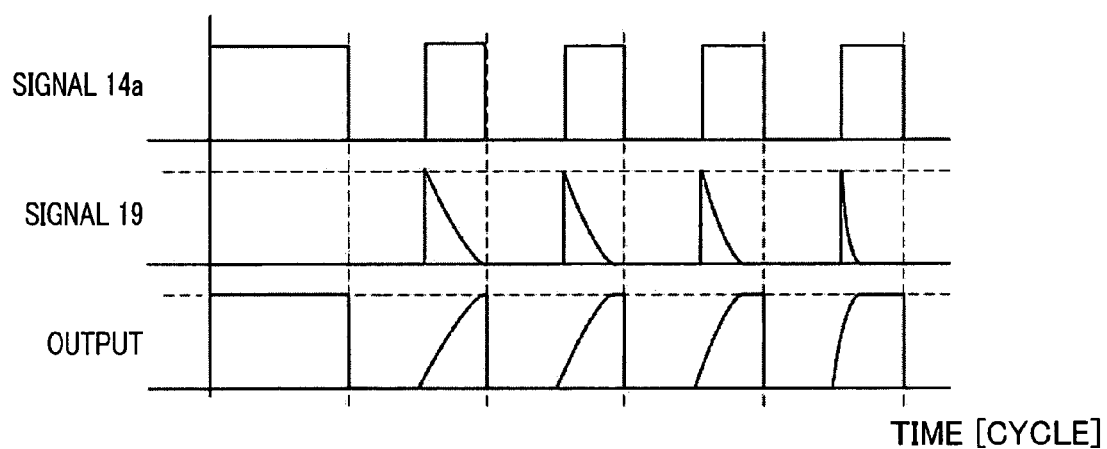
FIG. 13 shows waveforms of an input signal and a determining signal.

The drive circuit 14 to which the H level control circuit 42 is added as shown in FIG. 5 is identical with the drive circuit 13, except that the H level control circuit is provided in place of the L level control circuit. FIG. 13 shows operating waveforms of the drive circuit 14.

Vertical dotted lines in the figure divide time into five intervals, first interval to fifth interval, in a manner identical with those in FIG. 12. The first interval is immediately before the start of the charge pump. In the next interval (second interval), the charge pump starts. In each of the intervals after the first interval, the first half corresponds to a period for charging the capacitor C12, while the second half corresponds to a period for charging the capacitor C11.

In the second interval and the following intervals, the rate of decrease of the signal 19 and the rate of increase of the output of the drive circuit 14 become steep as time advances.

As shown in FIG. 13, the output of the drive circuit 14 is switched between High and Low in accordance with the signal 14a. The H level changes in accordance with the determining signal 19.

The H level of the output of the drive circuit 14 decreases as the determining signal 19 increases. The H level increases as the determining signal 19 decreases.

The determining signal 19 is a signal supplied from the monitor circuit 17b. As a comparison between the determining signal 19 and the potential difference ΔV12 of the switch Q12, the following equation holds true.

(determining signal 19)=hΔV12

In the equation above, h is an optionally-determinable coefficient. In the present example, h is a positive value.

If the potential difference ΔV12 of the switch Q12 is large, the H level of the output decreases while the on-resistance of the switch Q14 increases. On this account, a current flowing in the path is restrained.

Figure 14:
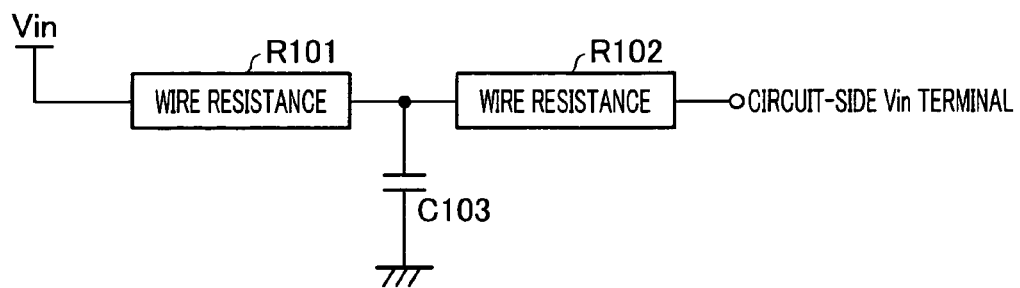
FIG. 14 is a circuit diagram showing the relationship between Vin and wire resistance.

The power supply voltage Vin of the charge pump circuit is supplied from a circuit shown in FIG. 14. Indicated by C103 is a capacitor (bypass capacitor) provided between the power source and GND, which is usually inserted for the use of an IC. In a case where an instantaneous current generated on account of the charge pump flows into a circuit-side Vin terminal via a resistance R102, a lowpass filter is formed by the resistance R101 and the capacitor C103, when viewed from the circuit side. Therefore, after the power is supplied from the capacitor C103 to the circuit side, the capacitor 103 is charged by supplying electric charges from Vin via the resistance R101, so that the capacitor 103 recovers the electric charges that have been lost.

Therefore, a rush current or peak current flowing into the resistance R101 on the start up may exert an adverse effect on other devices that commonly receives the voltage Vin.

Figure 15:
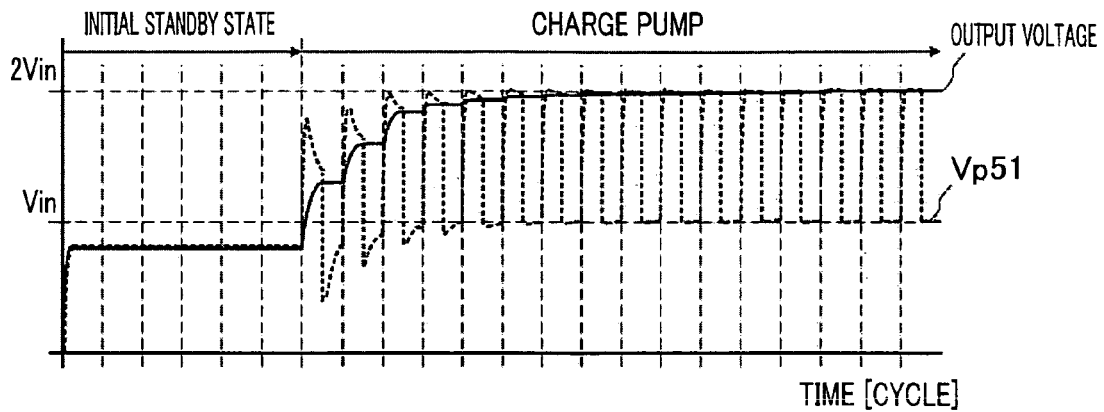
FIG. 15 is a graph showing an example of waveforms of an output voltage and Vp51.
Figure 16:
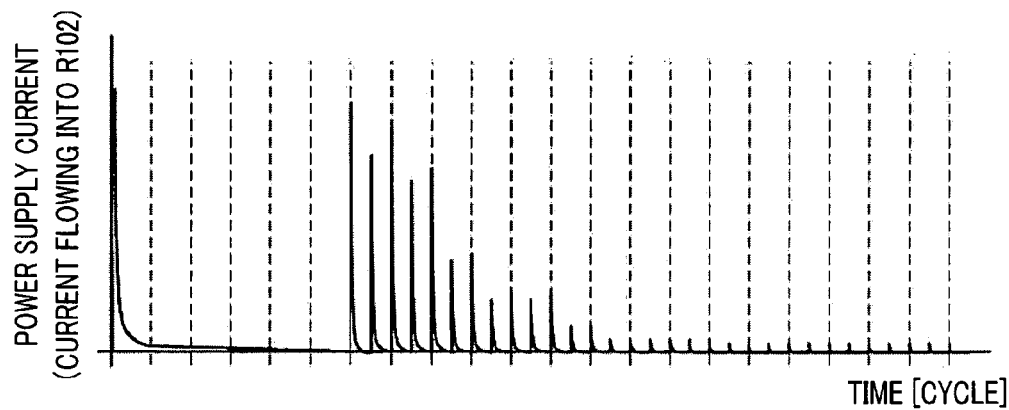
FIG. 16 is a graph showing an example of an waveform of a power supply current having passed through a bypass capacitor.
Figure 17:
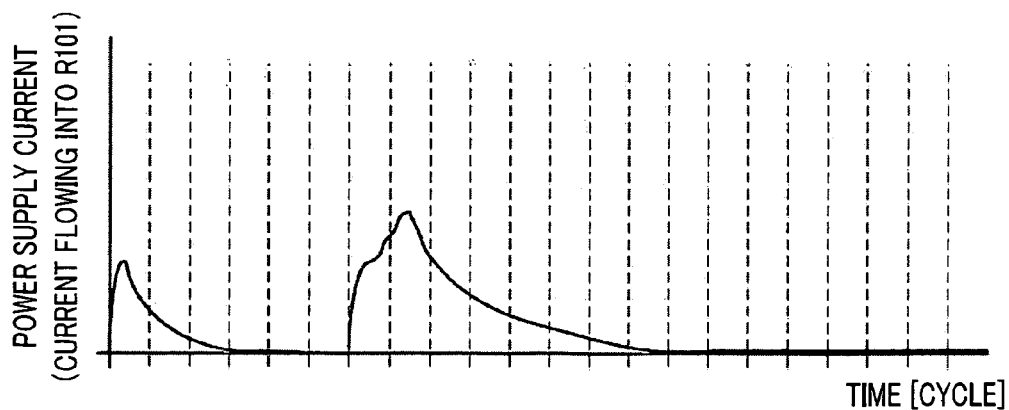
FIG. 17 is a graph showing an example of an waveform of the power supply current before passing through the bypass capacitor.

FIG. 15 shows an waveform of the output of the conventional charge pump DC/DC converter shown in FIG. 34. FIGS. 16 and 17 show an waveform of the power source current of the conventional charge pump DC/DC converter shown in FIG. 34. In FIG. 15, Vp51 indicates a voltage at the contact of the switches Q51 and Q52 and the capacitor C51 (in FIG. 34, the contact is indicated as A).

Figure 18:
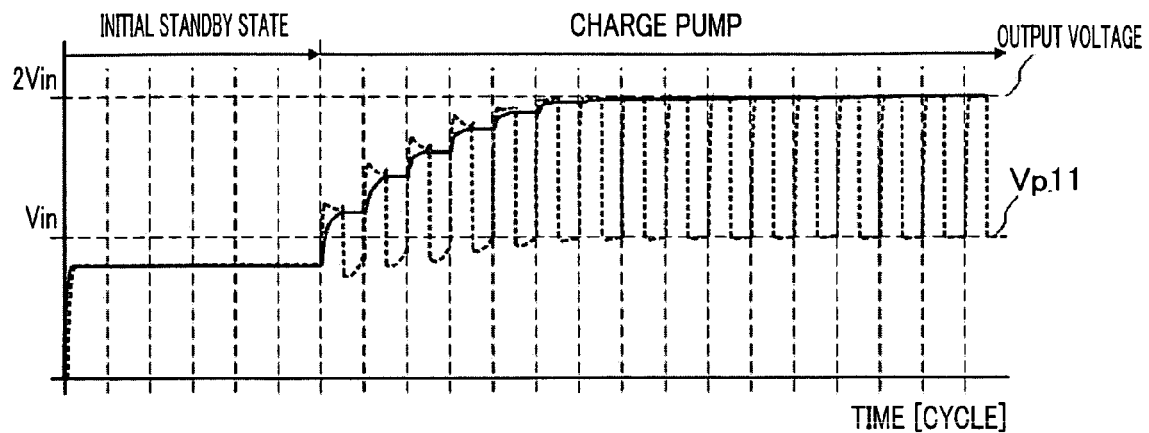
FIG. 18 is a graph showing an example of waveforms of an output voltage and Vp11.
Figure 19:
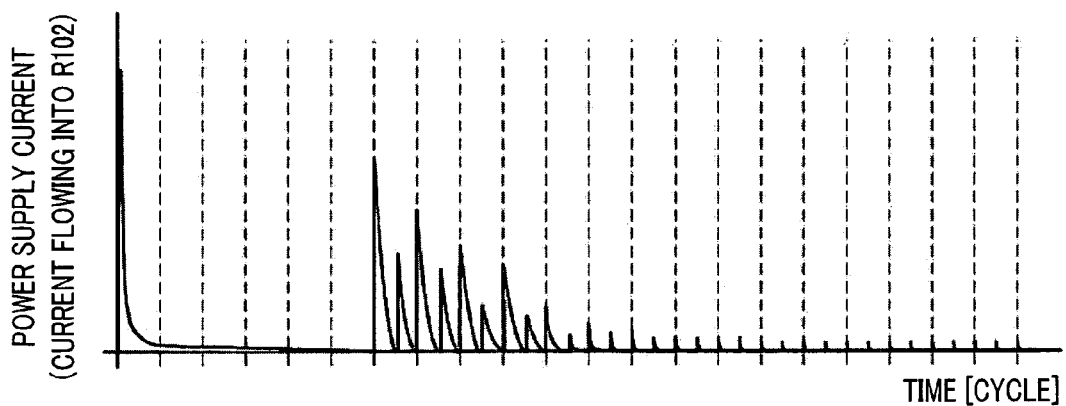
FIG. 19 is a graph showing an example of an waveform of the power supply current having passed through the bypass capacitor.
Figure 20:
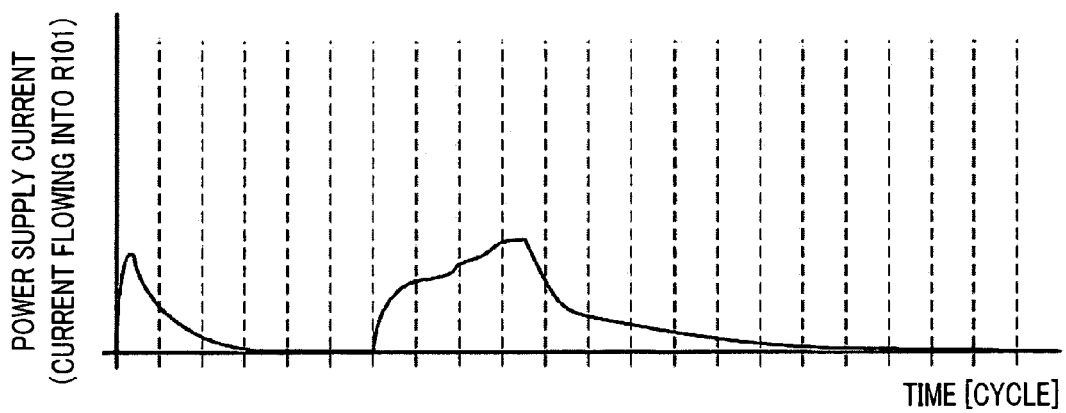
FIG. 20 is a graph showing an example of an waveform of the power supply current before passing through the bypass capacitor.

FIG. 18 shows an waveform of the output of the charge pump DC/DC converter shown in FIG. 1. FIGS. 19 and 20 shows an waveform of the power source current of the charge pump DC/DC converter shown in FIG. 1. In FIG. 18, Vp11 indicates a voltage at the contact of the switches Q11 and Q12 and the capacitor C11 (in FIG. 1, the contact is indicated as A).

In the circuit shown in FIG. 1, as shown in FIGS. 19 and 20, a current flowing in the resistance R102 is temporally dispersed. With this, a current flowing in the resistance R102 is restrained.

The rise and fall of the voltage Vp11 shown in FIG. 18 is milder than the rise and fall of the voltage Vp51 shown in FIG. 15. Also, the rise of the output voltage in FIG. 18 is milder than the rise of the output voltage in FIG. 15.

In this manner, in the present invention, a drive circuit is controlled while the potential difference between the terminals of a semiconductor SW at the time of the charge pump is monitored. With this, a current flowing in the path is restrained, so that a rush current on the start up of the charge pump circuit and a peak current on account of load fluctuation are restrained. It is therefore possible to prevent other devices from receiving an adverse effect.

In the present invention, it is unnecessary to incorporate an additional circuit into a charge pump SW circuit of the charge pump DC/DC converter. It is therefore unnecessary to control additional charge pump, and hence there is no adverse effect on the original characteristics of the charge pump.

According to the aforesaid arrangement, it is possible to incorporate a rush current restraining circuit into a charge pump DC/DC converter, irrespective of the type, number of stages, and driving method of the converter.

Being alternative to the arrangement shown in FIG. 1, a circuit adopting a plurality of step-up capacitors may be constructed as below.

In this circuit, provided that a first-stage capacitor and a second-stage capacitor form a capacitor pair, the second-stage capacitor of the capacitor pair functions as the second-stage capacitor of another capacitor pair.

Figure 21:
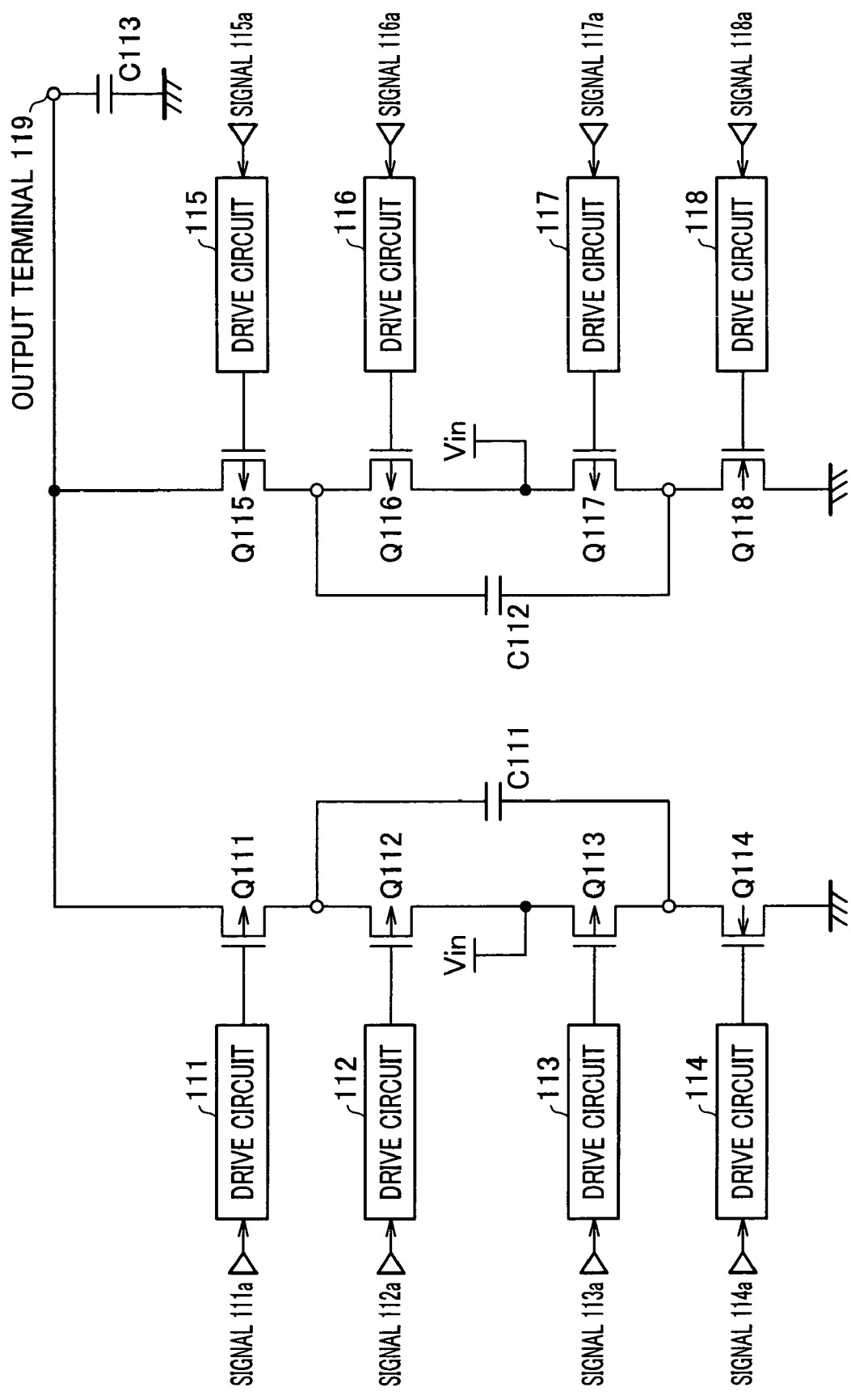
FIG. 21 is a circuit diagram showing a circuit in which a plurality of step-up capacitors are provided.

FIG. 21 shows a circuit which is identical to the doubler shown in FIG. 34 except that a step-up capacitor C112 is additionally provided. This circuit does not include a monitor circuit. In connection with the addition of the step-up capacitor, semiconductor switches Q115–Q118 (first and second semiconductor switches) and drive circuits 115–118 (third and fourth drive circuits) are also additionally provided. Each of the group of semiconductor switches Q111–Q114 and the group of semiconductor switches Q115–Q118, each semiconductor switch including a MOS transistor, is identical with the group of semiconductor switches shown in FIG. 1. Also, the first-stage capacitor C111 and the second-stage capacitor C113 form a capacitor pair, while the first-stage capacitor C112 and the second-stage capacitor C113 form another capacitor pair. The second-stage capacitor C113 is shared between these two capacitor pairs. The output terminal 119 outputs a resultant output.

Figure 22:
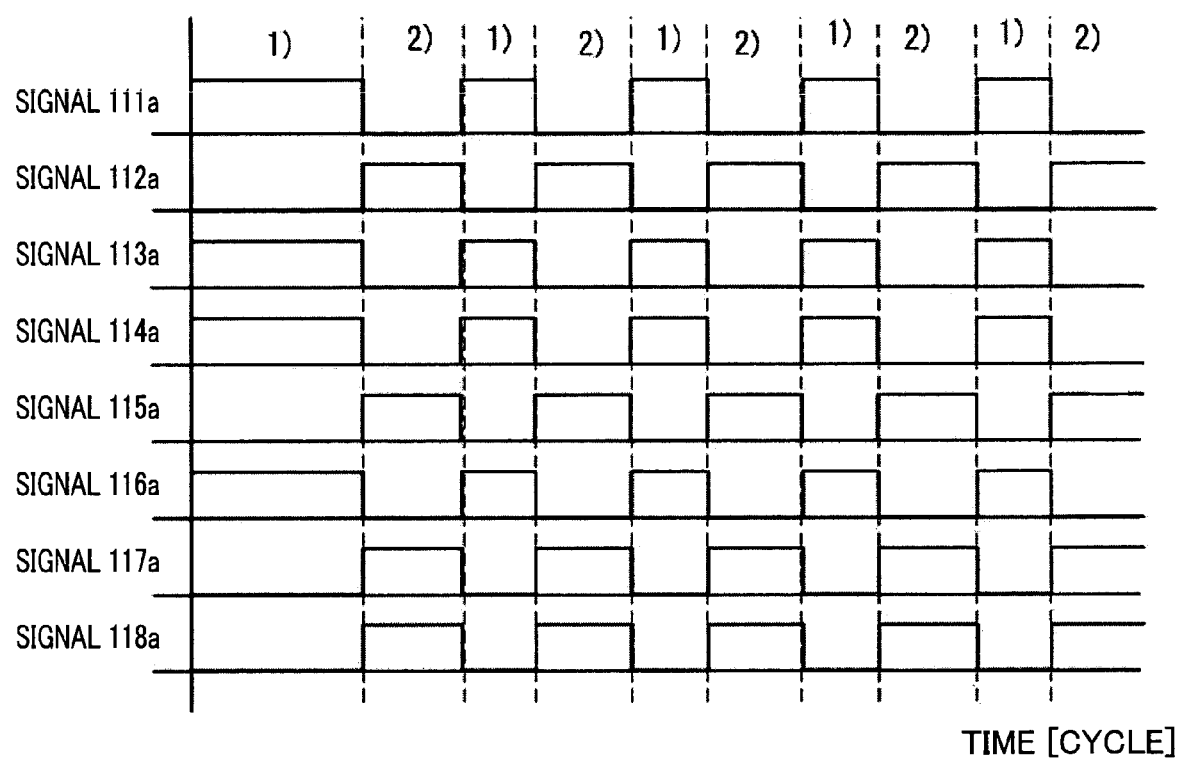
FIG. 22 shows waveforms of input signals.

FIG. 22 shows an example of waveforms of signals 111a–118a supplied to the respective drive circuits. In each interval, the signals 115a–118a have opposite values to the signals 111a–114a. Also, in each interval, the signals 111a–114a have identical values with the signals 11a–14a shown in FIG. 11.

The circuit shown in FIG. 34 obtains the output by repeating the following states 1) and 2):

1) In a state where the step-up capacitor C51 is charged up to the voltage Vin (first period); and 2) In a state where the output capacitor C52 is discharged up to a voltage which is the sum of the voltage of the capacitor C51 and the voltage Vin (second period).

In the meanwhile, the circuit shown in FIG. 21 obtains the output by repeating the following states 1) and 2):

1) In a state where (i) the step-up capacitor C111 is charged up to the voltage Vin while (ii) the output capacitor C113 is charged up to a voltage which is the sum of the voltage of the step-up capacitor C112 and the voltage Vin; and 2) In a state where (i) the output capacitor C113 is charged up to a voltage which is the sum of the voltage of the step-up capacitor C111 and the voltage Vin while (ii) the step-up capacitor C112 is charged up to the voltage Vin.

The circuit shown in FIG. 21 is generally used, and is always capable of charging the output capacitor up to a voltage twice as high as the voltage Vin.

Figure 23:
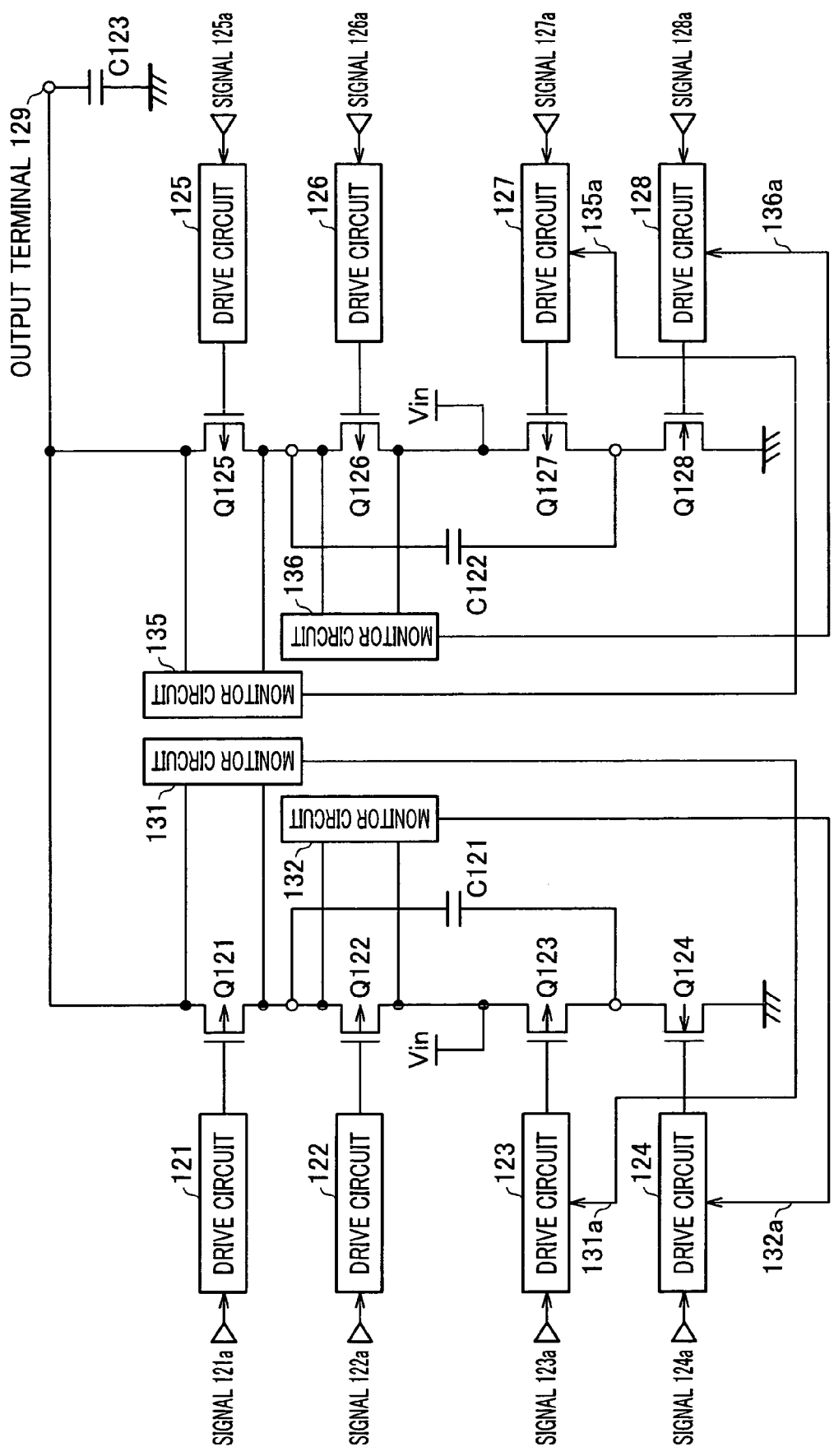
FIG. 23 is a circuit diagram showing a circuit in which a monitor circuit of Embodiment 1 and a plurality of step-up capacitors are provided.

FIG. 23 shows a case where the present invention is adopted to the circuit shown in FIG. 21. In the circuit of FIG. 23, drive circuits 123 and 127 are identical with those in FIG. 4, while drive circuits 124 and 128 are identical with those in FIG. 5. Also, a monitor circuit is further provided. Apart from these members, the circuit shown in FIG. 23 is identical with the circuit shown in FIG. 21.

Monitor circuits 131, 132, 135 (fourth monitor circuit), and 136 (third monitor circuit) and determining signals 131a, 132a, 135a (fourth determining signal), and 136a (third determining signal) supplied therefrom are identical with those in FIG. 1. Also, drive circuits 121–128 and signals 121a–128a supplied thereto are identical with those shown in FIG. 21. The descriptions of these circuits and signals are therefore omitted.

As described above, even when a step-up capacitor is additionally provided, it is unnecessary to change the original arrangement of the charge pump circuit shown in FIG. 21, as in the case of FIG. 1.

In addition to the above, a triple, quadruple, quintuple, . . . step-up circuits (in general terms, n-times step-up circuit (n-times charge pump circuit; n is an integer not less than 2)) can be realized as below.

In such a circuit, provided that a first-stage capacitor and a second-stage capacitor forms a capacitor pair, the second-stage capacitor of the first capacitor pair functions as the first-stage capacitor of the second capacitor pair.

Figure 24:
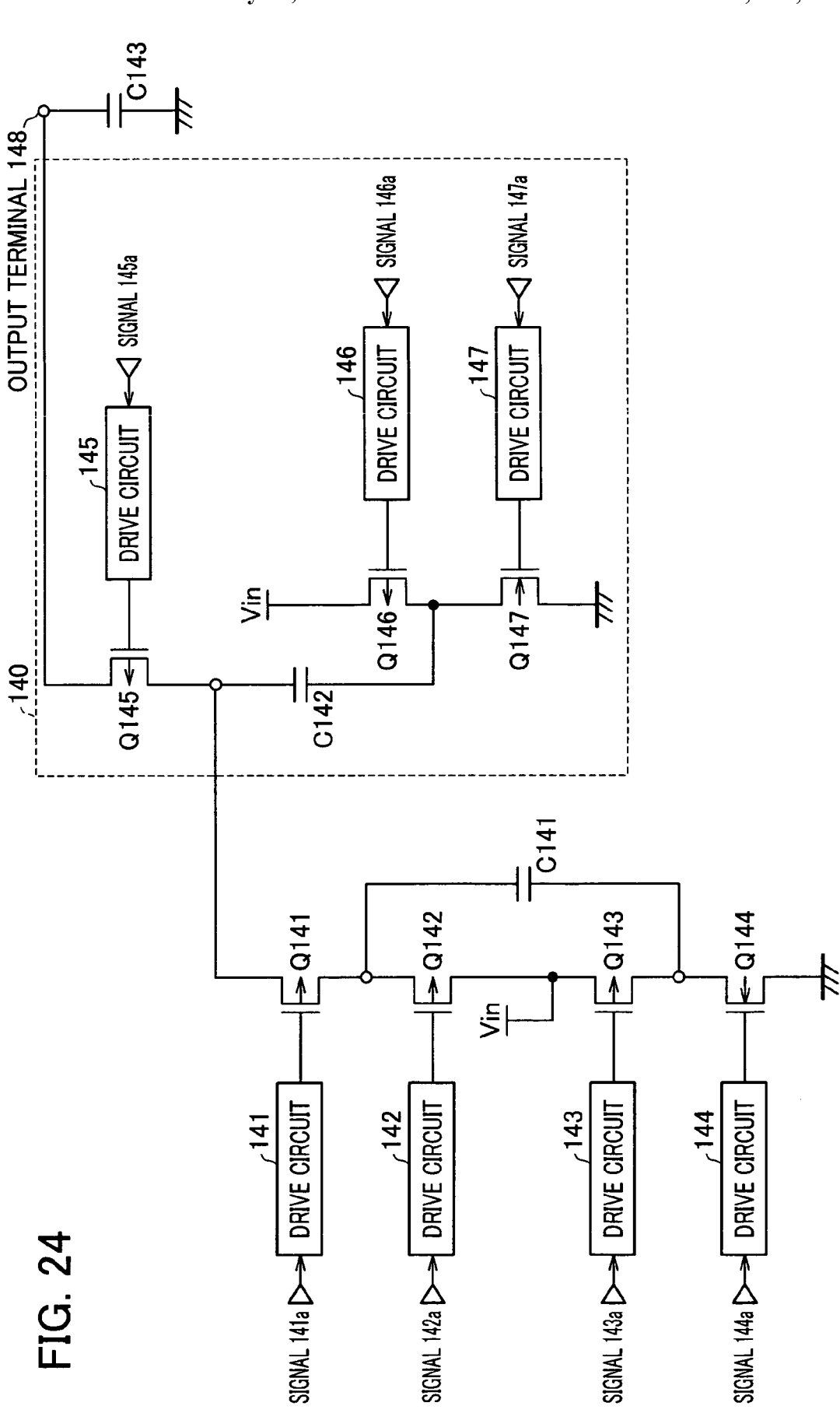
FIG. 24 is a circuit diagram of an n-times step-up circuit.

FIG. 24 shows a triple step-up circuit which is not provided with a monitor circuit. As shown in this figure, the circuit includes (i) a charge pump circuit (on the left side of the figure) identical with the double step-up circuit shown in FIG. 34, which includes semiconductor switches Q141–Q144 each including a MOS transistor, and (ii) an additional charge pump circuit 140 (on the right side of the figure) which includes semiconductor switches Q145–Q147 each including a MOS transistor. The output section of the double step-up circuit shown in FIG. 34 is connected to the input section of the charge pump circuit 140 shown in FIG. 24, and the output section of the charge pump circuit 140 functions as an output terminal. The switches Q141–Q144 are identical with those shown in FIG. 1. The first-stage capacitor C141 and the second-stage capacitor C142 (first capacitor) forms a capacitor pair, while the first-stage capacitor C142 and the second-stage capacitor C143 (second capacitor) forms another capacitor pair. The second-stage capacitor C142 of the first capacitor pair functions as the first-stage capacitor of the second capacitor pair. The resultant voltage is outputted from an output terminal 148.

Figure 25:
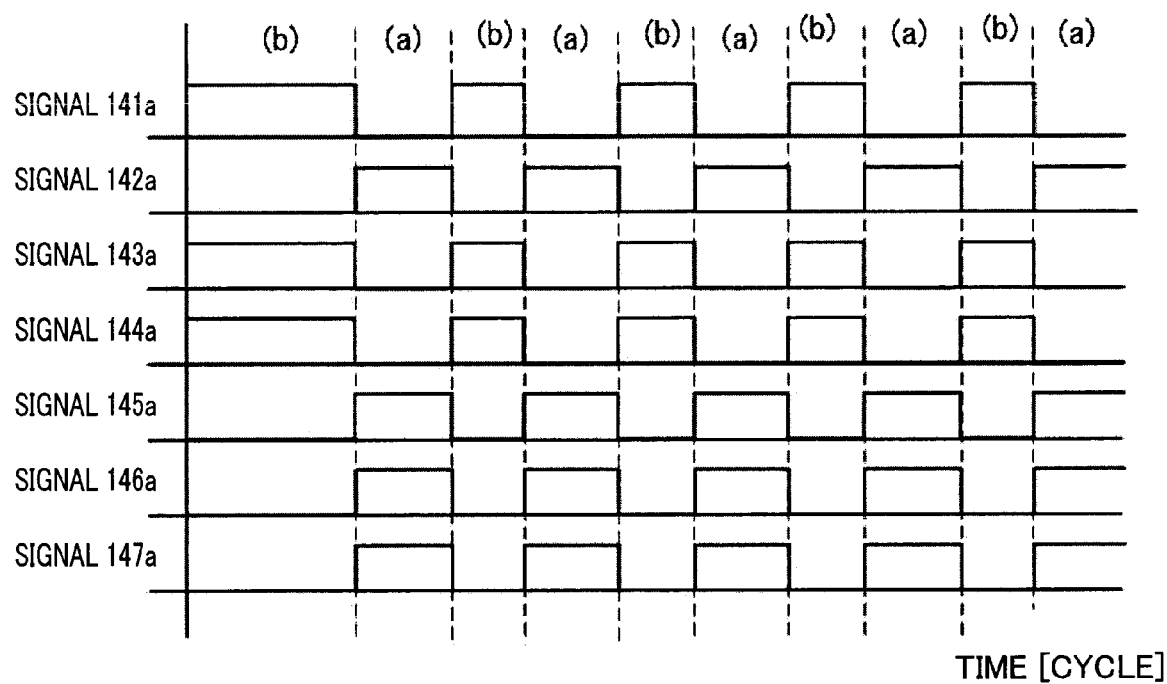
FIG. 25 shows waveforms of input signals.

FIG. 25 shows an example of waveforms of signals 141a–147a supplied to the respective drive circuits. In each interval, the signals 145a–147a have values identical with that of the signal 142a. Also, in each interval, the signals 141a–144a have values identical with those of the signals 11a–14a shown in FIG. 11.

In FIG. 25, the first interval marked (b) (first interval) is a period immediately before the start of the charge pump. In the interval (second interval) after the interval (b), the charge pump starts. Each of the second interval and the following intervals is divided into a first half (marked (a)) and a second half (marked (b)). One interval corresponds to a cycle of the aforesaid clock signal.

In each of the second interval and the following intervals, indicated by (a) and (b) are partial-intervals corresponding to the timings of turning on and off a semiconductor switch to be controlled. In the partial-intervals (a), the switches corresponding to the signals 141*a*, 142*a*, 143*a*, and 144*a* turn on, off, on, and off. On the other hand, in the partial-intervals (b), the switches corresponding to the signals 141*a*, 142*a*, 143*a*, and 144*a* turn off, on, off, and on, respectively.

The circuit shown in FIG. 24 repeats the following states (a) and (b):

(a) A state where the capacitor C141 is charged up to the voltage Vin, while the capacitor C143 is charged up to a voltage (three times as high as Vin) which is the sum of the voltage (twice as high as Vin) of the capacitor C142 and the voltage Vin; and (b) A state where the capacitor C142 is charged up to a voltage (twice as high as Vin) which is the sum of the voltage (Vin) of the capacitor C141 and the voltage Vin. Alternately repeating the states (a) and (b), it is possible to output a voltage three times as high as the voltage Vin.

Furthermore, quadruple, quintuple, . . . , and n-times step-up circuits can be constructed by adding one, two, . . . n–3 charge pump circuits 140 to the circuit shown in FIG. 24.

Figure 26:
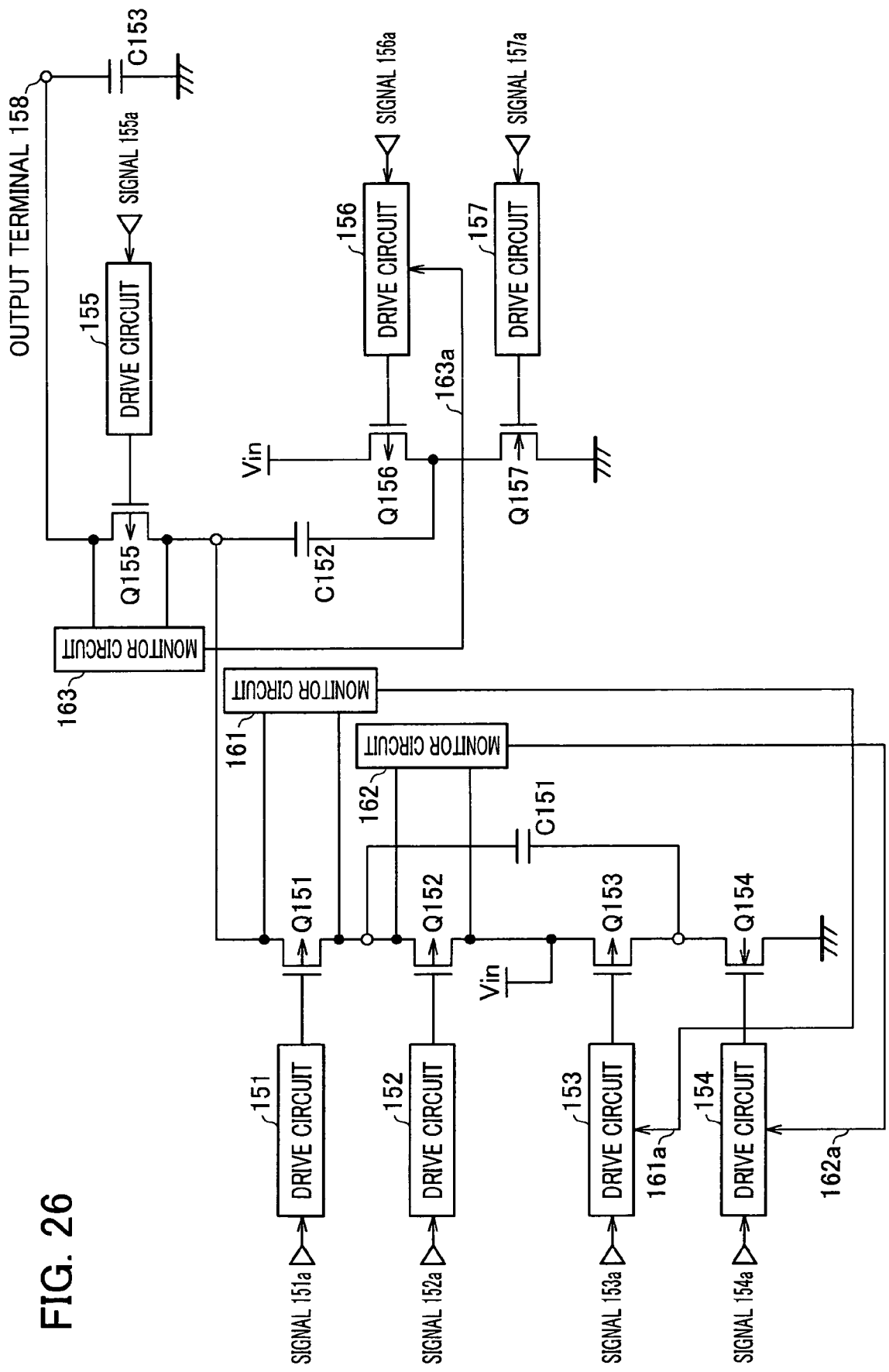
FIG. 26 shows a circuit diagram of an n-times step-up circuit including the monitor circuit of Embodiment 1.

FIG. 26 shows a circuit in which the present invention is adopted to the circuit shown in FIG. 24. In FIG. 26, drive circuits 153 and 156 are identical with those shown in FIG. 4, while a drive circuit 154 is identical with that of FIG. 5. Also, a monitor circuit is further provided. Apart from these members, the circuit shown in FIG. 26 is identical with the circuit shown in FIG. 24.

Monitor circuits 161–63 (fifth monitor circuit) and determining signals 161*a*–163*a* (fifth determining signals) supplied therefrom are identical with those shown in FIG. 1. Also, drive circuits 151–157 and signals 151*a*–157*a* supplied thereto are also identical with those shown in FIG. 24. For this reason, the details of these circuits and signals are omitted.

As shown in FIG. 26, it is unnecessary to change the original configuration of the triple (n-times, in general) step-up circuit shown in FIG. 24.

Embodiment 2

Embodiment 1 described how the rush current and peak current at the time of the charge pump of a charge pump circuit are restrained. Incidentally, since a charge pump circuit is a power supply circuit, it is necessary to consider a ripple of the output voltage, in addition to the aforesaid rush current and peak current.

A charge pump circuit 210 of Embodiment 2 includes the charge pump circuit 1 of Embodiment 1 and an output voltage monitor circuit 205 for reducing an output ripple. The output voltage monitor circuit 205 restrains the output voltage of the charge pump circuit 210 to be not higher than a predetermined level, in a case where the switches Q11 and Q13 are turned on while the switches Q12 and Q14 are turned off (i.e. in a second period; discharge period, predetermined period). This makes it possible to eliminate a drop voltage in the discharge period. That is, it is possible to minimize a drop voltage (ripple voltage) that occurs in the drive period (charge period and discharge period) on account of a load current. In other words, the drop voltage occurs only in the charge period. This results in the decrease in the output ripple. The details are given below.

Figure 27:
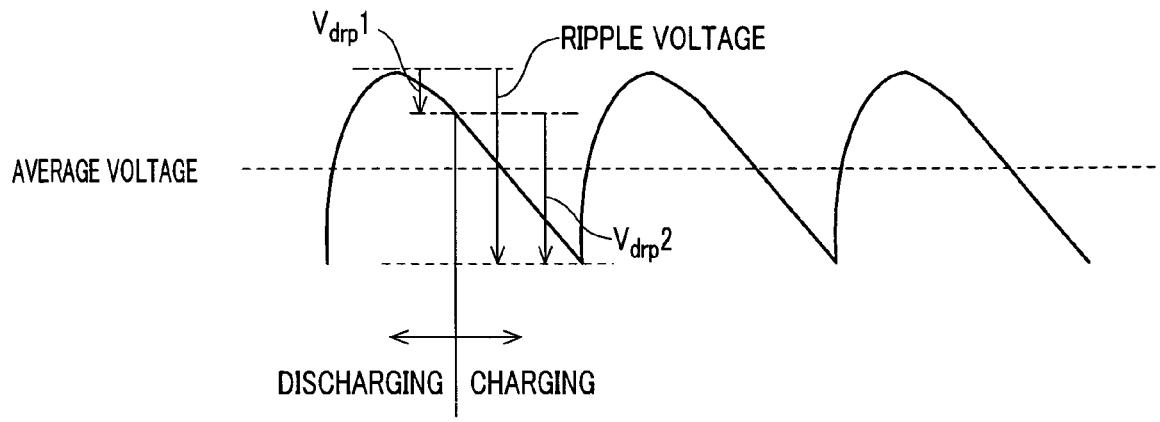
FIG. 27 shows an output waveform of a conventional charge pump DC/DC converter.
Figure 28:
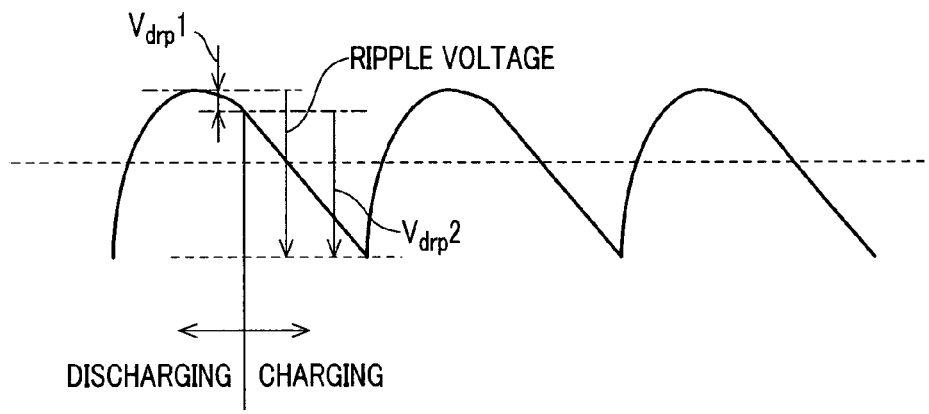
FIG. 28 shows an output waveform of the charge pump DC/DC converter of Embodiment 1.
Figure 29:
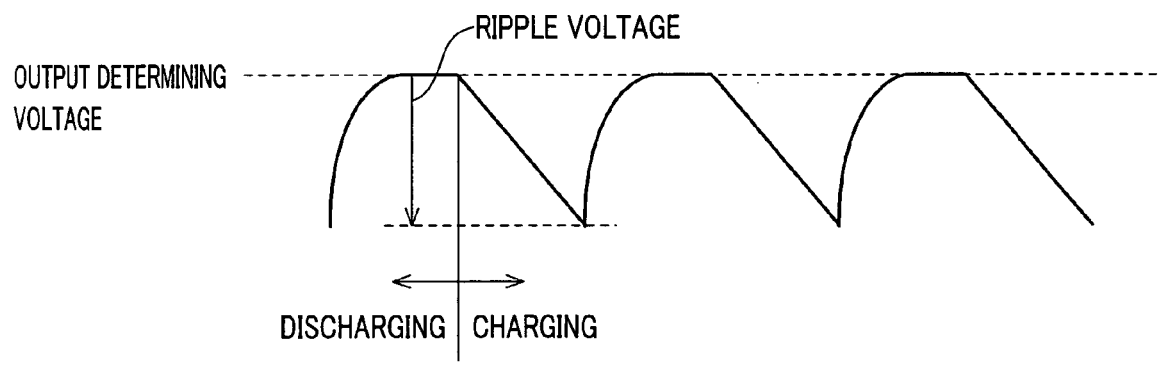
FIG. 29 shows an output waveform of a charge pump DC/DC converter of Embodiment 2.

FIG. 27 shows an output waveform of a conventional charge pump circuit 5 shown in FIG. 34. FIG. 28 shows an output waveform of the charge pump circuit 1. FIG. 29 shows an output waveform of the charge pump circuit 210.

The output voltage of the charge pump circuit 5 has an output ripple shown in FIG. 27. In the figure, Vdrp1 indicates a drop voltage in the discharge period, while Vdrp2 indicates a drop voltage in the charge period.

The output voltage of the charge pump circuit 1 has an output ripple shown in FIG. 28. As the figure clearly shows, the output ripple of the charge pump circuit 1 is restrained as compared to the output ripple of the charge pump circuit 5. This reduction of the ripple is caused by the reduction of a rush current and peak current at the time of the charge pump.

Provided that the charge pump circuits 5 and 1 are identical to each other except the limitation of a rush current and peak current at the time of the charge pump, the charge pump circuits 5 and 1 have identical drop voltages (Vdrp2) which are caused by load currents in the respective charge periods. Therefore, one can understand that the reduction of the output ripple is achieved by lowering the drop voltage (Vdrp1 in the figure) in the discharge period. In other words, the reduction is achieved by tightening the limit of the rush current and peak current (i.e. increasing the on-resistance of the switch).

In this case, however, the limit of the rush current and peak current must be changed. Also, if the limit of the rush current and peak current is too tightened, the target voltage may not be achieved in a case where the load current is large.

Taking into consideration of this problem, as described above, the output voltage monitor circuit 205 controls, in the discharge period, the output voltage of the charge pump circuit 210 in such a manner as to restrain the output voltage to be not higher than a predetermined level (output determining voltage described below) (see FIG. 29).

As described above, the charge pump circuit 210 is identical with the charge pump circuit 1 except that the output voltage monitor circuit 205 is additionally provided. On this account, the charge pump circuit 210 can achieve not only the reduction of the output ripple but also the reduction of the rush current and charge current at the time of the charge pump. In the example above, the output voltage monitor circuit 205 controls the output voltage of the charge pump circuit 210 not to be equal to or higher than a predetermined level. Alternatively, as described below, the output voltage of the charge pump circuit 210 may be controlled so as to be equal to a predetermined level, in a case where the predetermined level has a certain value.

Now, the specific arrangement and operation of the charge pump circuit 210 that can reduce the output ripple are discussed. The discussion is given under the premise that the output voltage of the charge pump circuit 210 is controlled so as to be a predetermined level.

Figure 30:
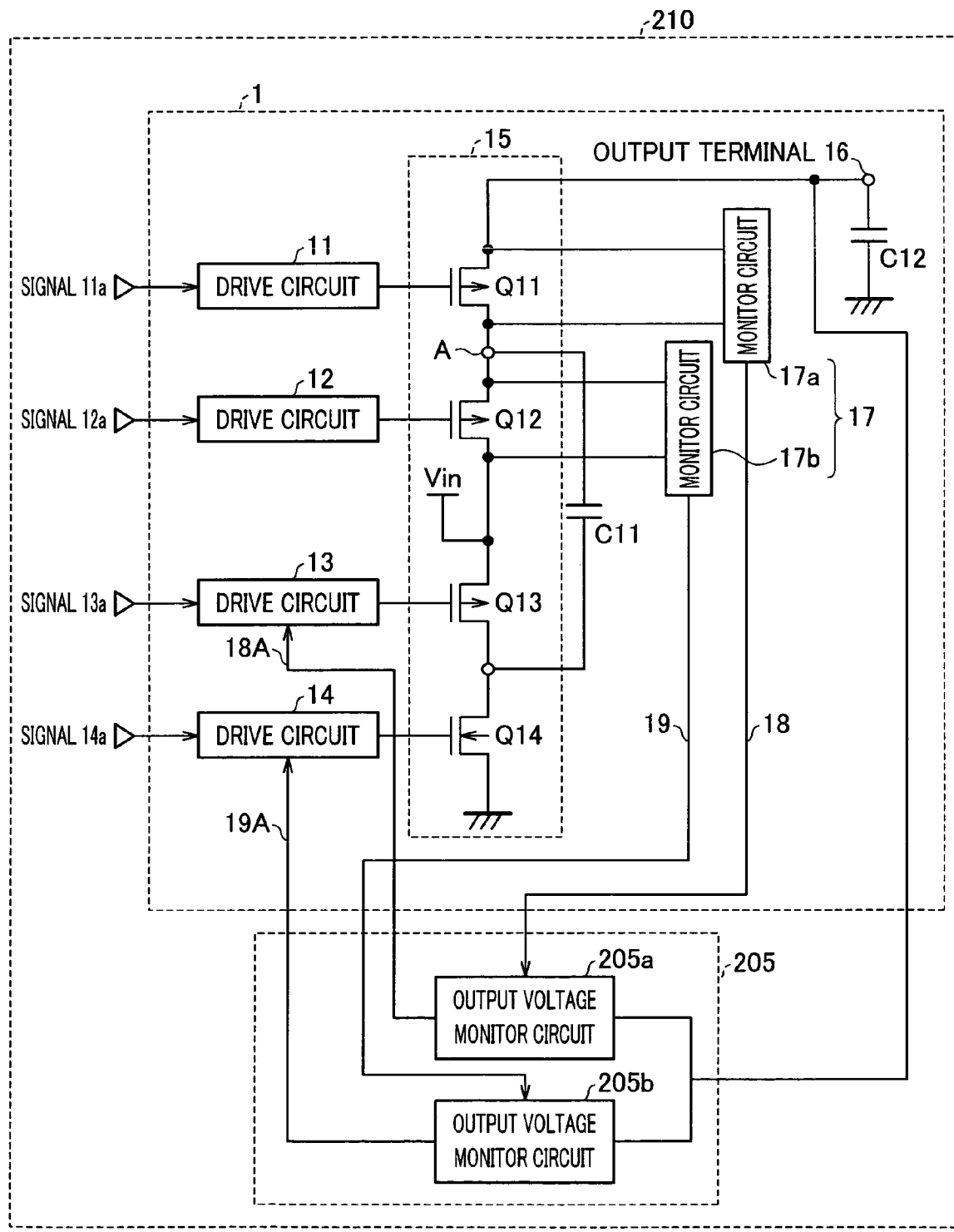
FIG. 30 is a block diagram of an example of the charge pump DC/DC converter of Embodiment 2.

FIG. 30 shows the charge pump circuit 210.

As shown in the figure, the charge pump circuit 210 is identical with the charge pump circuit 1, except that the output voltage monitor circuit 205 (output voltage monitor circuits 205*a* and 205*b*) is further provided. The details of the charge pump circuit 210 are given. It is noted that, as described above, the charge pump circuit 210 is identical with the charge pump circuit 1, except that the output voltage monitor circuit 205 is further provided. The description below therefore mainly deals with the output voltage monitor circuit 205.

The output voltage monitor circuit 205*a* detects the output voltage of the charge pump circuit 210, compares the detected output voltage to a predetermined output determining voltage, so as to generate an output determining signal which is used for controlling the output voltage. Then the output voltage monitor circuit 205*a* adds, to the output determining signal, the signal 18 which is outputted from the monitor circuit 17*a*, so as to generate a signal 18A used for varying the on-resistance of the switch Q13. The generated signal 18A is supplied to the drive circuit 13.

In a similar manner, the output voltage monitor circuit 205*b* detects the output voltage of the charge pump circuit 210, compares the detected output voltage to a predetermined output determining voltage, so as to generate an output determining signal which is used for controlling the output voltage. Then the output voltage monitor circuit 205*b* adds, to the output determining signal, a signal 19 which is outputted from the monitor circuit 17*b*, so as to generate a signal 19A used for varying the on-resistance of the switch Q14. The generated signal 19A is supplied to the drive circuit 14.

In this way, the on-resistances of the switches Q13 and Q14 are controlled so that not only the rush current and peak current but also the output ripple are restrained. It is noted that the control of the on-resistances of the switches Q13 and Q14 by the respective drive circuits 13 and 14 is carried out in a manner similar to the control discussed in Embodiment 1. The details are therefore omitted.

Figure 31:
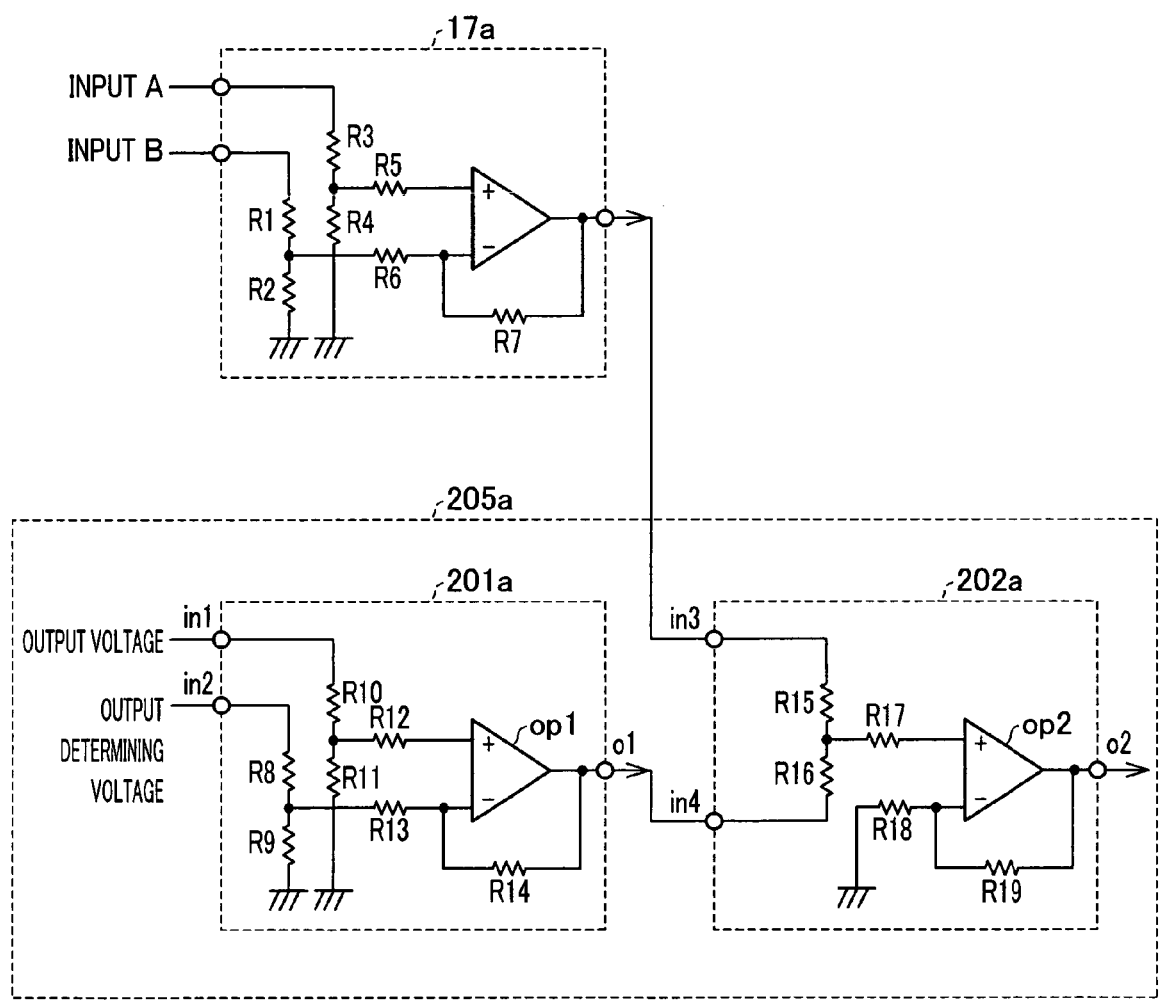
FIG. 31 is a circuit diagram of an example of an output voltage monitor circuit (for L level control) of the charge pump DC/DC converter.

FIG. 31 specifically illustrates the output voltage monitor circuit 205*a*.

As described in the figure, the output voltage monitor circuit 205*a* includes an output determining circuit 201*a* and an adder circuit 202*a*. The output determining circuit 201*a* compares the output voltage of the charge pump circuit 210 to a predetermined output determination setting voltage, so as to generate an output determining signal. The adder circuit 202*a* sums up (i) the output determining signal generated by the output determining circuit 201*a* and (ii) the signal 18 outputted from the monitor circuit 17*a*, so as to generate the signal 18A used for varying the on-resistance of the switch Q13.

The output determining circuit 201*a* includes an operational amplifier OP1 and resistors R8–R14. An input terminal in1 receives the output voltage of the charge pump circuit 210. An input terminal in2 receives the output determining voltage which is compared with the output voltage of the charge pump circuit 210. An output terminal o1 outputs the determining signal.

The resistors R8 and R13 are provided between the input terminal in2 and an inverting input terminal of the operational amplifier OP1. The resistor R9 is provided between (i) the connection point of the resistors R8 and R13 and (ii) GND. Similarly, the resistors R10 and R12 are provided between the input terminal in1 and a non-inverting input terminal of the operational amplifier OP1. The resistor R11 is provided between (i) the connection point of the resistors R10 and R12 and (ii) GND. The resistor R14 is provided between the inverting input terminal of the operational amplifier OP1 and the output terminal o1.

In a case where the output voltage of the charge pump circuit 210 is larger than the output determining voltage, the output determining circuit 201*a* generates an output determining signal J1 that increases the on-resistance of the switch Q13 (e.g. increases the on-resistance of the switch Q13 in proportion to the difference between the output voltage and the output determining voltage). Alternatively, the output determining circuit 201*a* generates a determining signal J1 that turns the switch Q13 off.

On the other hand, in a case where the output voltage of the charge pump circuit 210 is smaller than the output determining voltage, the output determining circuit 201*a* generates an output determining signal J2 that reduces the on-resistance of the switch Q13 (e.g. reduces the on-resistance of the switch Q13 in proportion to the difference between the output voltage and the output determining voltage. Alternatively, the output determining circuit 201*a* generates a determining signal J2 that turns the switch Q13 on.

The output determining voltage can be optionally set on condition that the charge pump circuit 210 is capable of outputting that voltage. For example, the output determining voltage is set so that a sufficient voltage is supplied to circuits connected to the charge pump circuit 210. In the present case, the output determining voltage has a minimum value for meeting the requirement above.

The adder circuit 202*a* includes an operational amplifier OP2 and resistors R15–R19. An input terminal in3 receives the signal 18 supplied from the monitor circuit 17*a*. An input terminal in4 receives the determining signal supplied from the output determining circuit 201*a*. An output terminal o2 outputs the signal 18A used for varying the on-resistance of the switch Q13.

One terminal of the resistor R15 is connected to the input terminal in3. One terminal of the resistor R16 is connected to the input terminal in4. Meanwhile, the other terminals of the respective resistors R15 and R16 are connected to each other. The resistor R17 is provided between (i) the connection point of the resistors R15 and R16 and (ii) a non-inverting input terminal of the operational amplifier OP2. The resistor R18 is provided between an inverting input terminal of the operational amplifier OP2 and GND. The resistor R19 is provided between the inverting input terminal of the operational amplifier OP2 and the output terminal o2.

Being similar to the output voltage monitor circuit 205*a*, the output voltage monitor circuit 205*b* includes an output determining circuit 201*b* and an adder circuit 202*b*. The output determining circuit 201*b* compares the output voltage of the charge pump circuit 210 to a predetermined output determination setting voltage, so as to generate an output determining signal. The adder circuit 202*b* sums up (i) the output determining signal generated by the output determining circuit 201*b* and (ii) the signal 19 supplied from the monitor circuit 17*b*, so as to generate a signal 19A used for varying the on-resistance of the switch Q14. The output determining circuit 201*b* and the adder circuit 202*b* are identical with the output determining circuit 201*a* and the adder circuit 202*a*, respectively.

Now, the following discusses the operation of the output voltage monitor circuit 205. As described above, the output voltage monitor circuit 205 operates in such a manner as to keep, in a discharge period, the output voltage of the charge pump circuit 210 to be equal to or lower than the output determining voltage (in the present case, the circuit 205 operates so that the output voltage is kept to be equal to the output determining voltage). On this account, the output voltage control of the charge pump circuit 210 is carried out using either one of the switches Q13 and Q14. In the present case, the output voltage control of the charge pump circuit 210 is carried out by controlling the switch Q13.

First, the output voltage monitor circuit 205*a* detects the output voltage of the charge pump circuit 210. The output determining circuit 201*a* compares the detected output voltage to the output determining voltage. If the output voltage is smaller than the output determining voltage, the output determining circuit 201*a* generates a determining signal J2. The determining signal J2 is supplied from the output determining circuit 201*a* to the adder circuit 202*a*. In the adder circuit 202*a*, the determining signal is added to the signal 18 supplied from the monitor circuit 17a, so that the signal 18A that reduces the on-resistance of the switch Q13 is supplied to the drive circuit 13. As a result, in the manner described in Embodiment 1, the on-resistance of the switch Q13 is controlled so that a current flowing from the reference voltage Vin to the step-up capacitor C11 increases and hence the output voltage increases.

Meanwhile, if the output voltage is larger than the output determining voltage, the determining signal J1 is generated. The determining signal J1 is supplied from the output determining circuit 201a to the adder circuit 202a. In the adder circuit 202a, the determining signal J1 is added to the signal 18 supplied from the monitor circuit 17a, so that the signal 18A that increases the on-resistance of the switch Q13 is supplied to the drive circuit 13. As a result, in the manner described in Embodiment 1, the on-resistance of the switch Q13 is controlled so that a current flowing from the reference voltage Vin to the step-up capacitor C11 decreases and hence the output voltage decreases.

Because of the operation above, the level of the output voltage of the charge pump 210 is controlled so as to be equal to the level of the output determining voltage. This eliminates redundant voltage increase during the charge period, so that the output ripple is restrained, as shown in FIG. 29.

Figure 32:
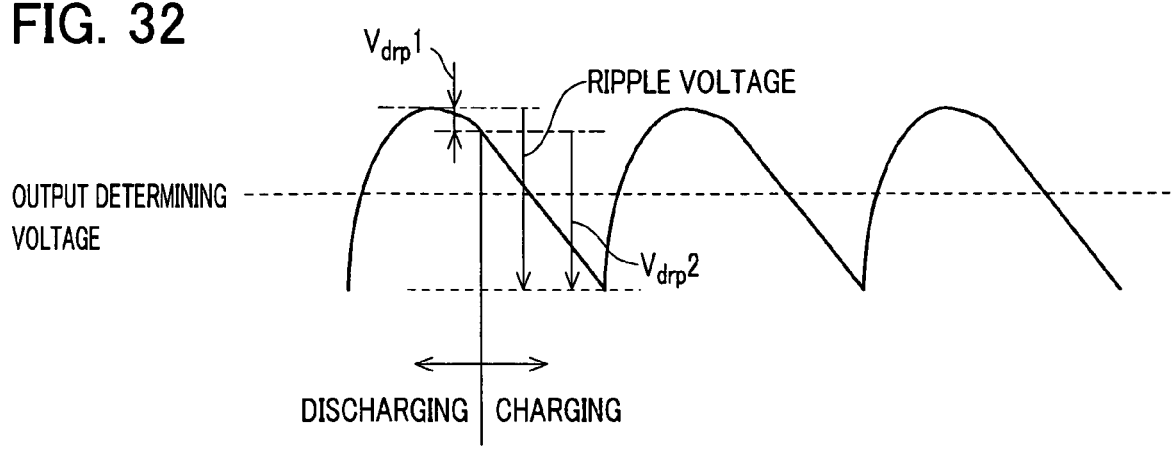
FIG. 32 shows an output waveform in a case where the conventional charge pump DC/DC converter is provided with an output voltage monitor circuit.

Referring to FIG. 32, the following discusses a case where a conventional charge pump circuit 5 shown in FIG. 34 is provided with the output voltage monitor circuit 205, i.e. in a case where the reduction of the output ripple is carried out without setting the limit of a rush current and peak current at the time of the charge pump.

FIG. 32 shows an output waveform of the aforesaid charge pump circuit.

If, for example, the output voltage of the charge pump circuit is larger than the output determining voltage, the output voltage monitor circuit 205 operates as above in order to reduce the output voltage. However, since the rush current and peak current at the time of the charge pump are not limited, the rise of the output voltage is not restrained and hence the output voltage is not controlled so as to be equal to the level of the preset voltage. In this manner, the output voltage control is not achieved simply by monitoring and feeding back the output voltage. In other words, the control of the output voltage, i.e. the reduction of the output ripple cannot be achieved unless an arrangement to reduce a rush current and a peak current at the time of the charge pump and an arrangement to reduce an output ripple are both provided.

As described above, the charge pump circuit 210 of Embodiment 2 includes an output voltage monitor circuit 205, and the output voltage monitor circuit 205 controls, during the discharge period, the level of the output voltage of the charge pump circuit 210 so as not to be higher than the level of an output determining voltage. This makes it possible to eliminate redundant voltage increase in the discharge period. That is, it is possible to minimize a drop voltage (ripple voltage) that occurs in the drive period (charge period and discharge period) on account of a load current. In other words, the drop voltage occurs only in the charge period. As a result, the output ripple is reduced concurrently with the reduction of the rush current and peak current, when the charge pump is carried out.

As clarified above, in the output voltage monitor circuit 205, the reduction of the output ripple is achieved only by adding the output determining signal, which is used for the reduction of the output ripple, to the signal used for the reduction of the rush current and peak current. In other words, the operation of the output voltage monitor circuit 205 is carried out independently of the reduction of the rush current and peak current. On this account, the operation of the circuit 205 does not interfere with the conventional control method. Therefore, it is unnecessary to additionally perform a complicated control for the reduction of the output ripple (i.e. it is unnecessary to additionally incorporate a circuit into the switch circuit 15 of the charge pump circuit 1).

Also, as described above, the operation of the output voltage monitor circuit 205 does not interfere with the reduction of the peak current and rush current and the conventional control method. On this account, the ripple voltage is not influenced by the preset voltage value and circuit control operation timing required for the reduction of the rush current and peak current. It is therefore possible to construct a charge pump circuit 210 in which the design-time setting of a ripple is easily done.

The level of the output voltage monitor circuit 205 can be optionally determined on condition that the charge pump circuit 210 can output that voltage. It is therefore possible to obtain a desired output with a reduced ripple, by appropriately setting the output ripple.

Figure 33:
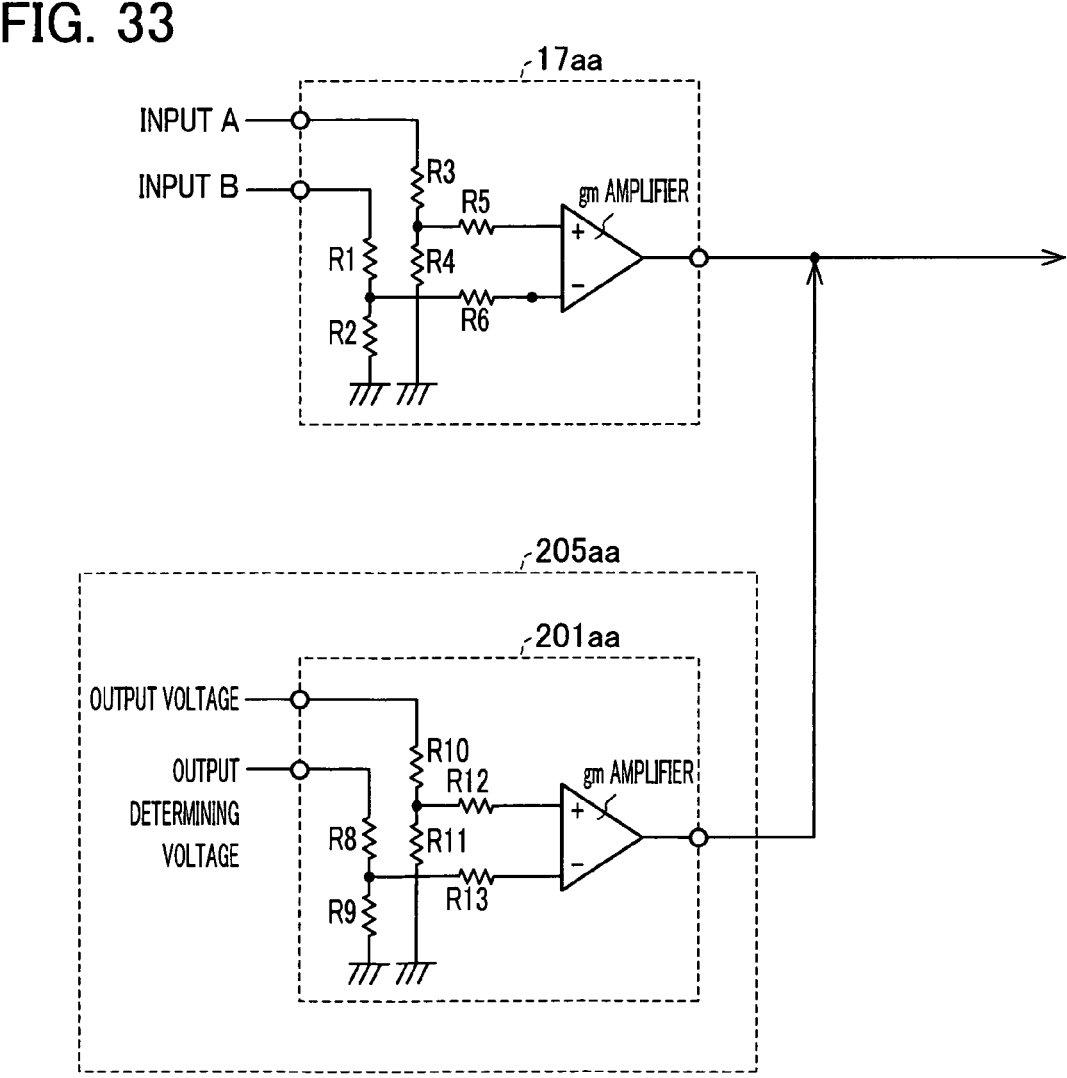
FIG. 33 is a circuit diagram of another example of the output voltage monitor circuit.

The output voltage monitor circuit 205 is not necessarily constructed as above. For example, the circuit 205 may be arranged as shown in FIG. 33, i.e. the circuit may be a current-control type, instead of the aforesaid voltage-control type. In such a case, the operational amplifier of the output determining circuit 201aa is a voltage-to-current conversion amplifier termed gm amplifier, and the adder circuit is not used. Note that, in this case the monitor circuit 17 and other circuits must also be the current-control type.

In Embodiment 2, the charge pump circuit 210 is provided with the charge pump circuit 1 and the output voltage monitor circuit 205. The charge pump circuit 210, however, is not necessarily constructed in this manner. For example, the charge pump circuit 210 may be arranged such that an output voltage monitor circuit is added to the circuit shown in FIG. 9, 10, 23, or 26. For example, in a case where the output voltage monitor circuit is added to the circuit shown in FIG. 23, the output voltage is always (in the drive period, predetermined period) monitored so as not to be higher than a predetermined level. Also, in a case where the output voltage monitor circuit is added to the circuit shown in FIG. 26, the output voltage in the period (a) (predetermined period) in the figure is controlled so as not to be higher than a predetermined level.

In the charge pump circuits of Embodiments 1 and 2, the number of semiconductor switches that are simultaneously turned on is two. Alternatively, the monitor circuit and output monitor circuit of the present invention may be provided in a charge pump circuit in which more than tow semiconductor switches are simultaneously turned on.

The present invention is not limited to the description of the embodiments above, but may be altered by a skilled person within the scope of the claims. An embodiment based on a proper combination of technical means disclosed in different embodiments is encompassed in the technical scope of the present invention.

The charge pump DC/DC converter circuit of the present embodiment may be arranged such that, a step-up capacitor is charged up to a power supply voltage, while an output capacitor is charged up to a voltage which is the sum of the voltage of the charged step-up capacitor and the power supply voltage, so that the voltage of the output capacitor is outputted as an output voltage, and in regard of a pair of semiconductor switches that turn on at the time of the charge pump, a monitor circuit detects a potential difference between the terminals of a first semiconductor switch so as to output a determining signal, while a control circuit outputs, to a second semiconductor switch, a drive signal that changes in accordance with the determining signal.

The aforesaid charge pump DC/DC converter circuit may be arranged such that, in a case where the potential difference of the first semiconductor switch is larger than a preset voltage, the output level of the control circuit is changed so that the on-resistance of the second semiconductor switch is increased, meanwhile, in a case where the potential difference of the first semiconductor switch is smaller than the preset voltage, the output level of the control circuit is changed so that the on-resistance of the second semiconductor switch is reduced.

The aforesaid charge pump DC/DC converter circuit may be arranged such that, in a case where the set-up capacitor is charged up to the power supply voltage, a potential difference between the terminals of a semiconductor switch that turns on/off a path from the power source to the step-up capacitor is detected, so that the on-resistance of a semiconductor switch that turns on/off a path from the step-up capacitor to GND is changed.

The aforesaid charge pump DC/DC converter circuit may be arranged such that, in a case where the output capacitor is charged up to a voltage which is the sum of the voltage of the charged step-up capacitor and the power supply voltage, a potential difference between terminals of a semiconductor switch that turns on/off a path from the step-up capacitor to the output capacitor is detected, so that the on-resistance of a semiconductor switch that turns on/off a path from the power source to the step-up capacitor is changed.

Taking the arrangements above together, the aforesaid charge pump DC/DC converter circuit, which charges an output capacitor by performing charge pump so as to output an output voltage, may include: (i) a monitor circuit that detects, at the time of charging a step-up capacitor up to a power supply voltage Vin, a potential difference between terminals of a semiconductor switch SW that turns on/off a path from the power source to the step-up capacitor, so as to supply a signal to a drive circuit of the semiconductor switch that turns on/off a path from the step-up capacitor to GND; and (ii) a monitor circuit that detects, at the time of charging the output capacitor up to a voltage which is the sum of the voltage of the charged step-up capacitor and the power supply voltage, a potential difference between the terminals of a semiconductor switch that turns on/off a path from the step-up capacitor to the output capacitor, so as to supply a signal to a drive circuit of the semiconductor switch SW that turns on/off a path from the power source to the step-up capacitor.

According to the arrangement above, at the time of charging the step-up capacitor up to the power supply voltage Vin, a current flowing in a path from the step-up capacitor to GND is restrained by increasing the on-resistance of a semiconductor switch that turns on/off a path from the step-up capacitor to GND, in a case where the potential difference between the terminals of a semiconductor switch that turns on/off the path from the power source to the step-up capacitor is larger than a preset voltage.

Also, at the time of charging the output capacitor up to a voltage which is the sum of the voltage of the charged step-up capacitor and the power supply voltage Vin, a current flowing in a path from the power source to the step-up capacitor is restrained by increasing the on-resistance of a semiconductor switch that turns on/off the path, if a potential difference between the terminals of a semiconductor switch that turns on/off a path from the step-up capacitor to the output capacitor is larger than a preset voltage.

Therefore, it is possible to moderate the increase of the current flowing in the path by setting the preset voltage at a desired value, at the time of manufacture or at the point of use.

On this account, it is possible to restrain a rush current and peak current at the time of the charge pump, using a conventional charge pump SW circuit. This reduction of the rush current and peak current is achieved without changing a circuit section (charge pump switch circuit) that includes a step-up capacitor, an output capacitor, and a switching element to which a control signal (clock) signal is supplied so that the charge/discharge of the step-up capacitor or the output capacitor is switched.

The above-described charge pump DC/DC converter circuit may include a plurality of step-up capacitors.

In addition to the above, the charge pump DC/DC converter circuit preferably arranged such that a level of the drive signal is changed so that the on-resistance of said at least one first semiconductor switches increases in proportion to a value which is worked out by subtracting a preset voltage from the detected potential difference.

According to the arrangement above, the on-resistances of the semiconductor switches being turned on in the first period increase as a value, which is worked out by subtracting the setting voltage from the potential difference between the terminals of one of the semiconductor switches being turned on in the first period, increases. On this account, in addition to the effects above, it is possible to easily achieve the increase in the on-resistances of the semiconductor switches.

In addition to the above, the charge pump DC/DC converter circuit of the present embodiment may be arranged such that, in a case where the first-stage capacitor is charged up to the power supply voltage, the first monitor circuit detects a potential difference between the terminals of one of the first semiconductor switches that turns on/off a path from a power source to the first-stage capacitor, so as to output the first determining signal corresponding to the detected potential difference, and the first drive circuit outputs, in response to the first determining signal, a drive signal to another one of the first semiconductor switches that turns on/off a path from the first-stage capacitor to a GND, the drive signal increasing on-resistance of said another one of the semiconductor switches in proportion to the detected potential difference.

According this arrangement, in a case where the first-stage capacitor is charged up to the power supply voltage, the on-resistance of the semiconductor switch that turns on/off the path from the first-stage capacitor to GND increases as the potential difference between the terminals of the semiconductor switch that turns on/off the path from the power source to the first-stage capacitor increases. In this manner, the semiconductor switch that measures the potential difference is different from the semiconductor switch whose on-resistance is controlled. On this account, the circuit arrangement is simplified, in addition to the effects above.

In addition to the above, the charge pump DC/DC converter circuit of the present embodiment may further include: a second monitor circuit which detects a potential difference between terminals of one of the second semiconductor switches that turns on/off a path from the first-stage capacitor to the second-stage capacitor, so as to output a second determining signal corresponding to the detected potential difference, in a case where the second-stage capacitor is charged up to a voltage which is sum of a voltage of the first-stage capacitor thus charged and the power supply voltage; and a second drive circuit that outputs, in response to the second determining signal, a drive signal to another one of the second semiconductor switches that turns on/off a path from a power source to the first-stage capacitor, the drive signal increasing on-resistance of said another one of the second semiconductor switches in proportion to the detected potential difference.

According to this arrangement, in a case where the second-stage capacitor is charged up to the voltage which is the sum of a voltage of the first-stage capacitor thus charged and the power supply voltage, the on-resistance of the semiconductor switch that turns on/off the path from the power source to the first-stage capacitor increases as the potential difference between the terminals of the semiconductor switch that turns on/off the path from the first-stage capacitor to the second-stage capacitor increases. (In other words, the semiconductor switch that measures the potential difference is different from the semiconductor switch whose on-resistance is controlled.)

On this account, a rush current and peak current, which are generated when a charge current is supplied even through a step-up capacitor or an output capacitor is not sufficiently charged, are further reduced, even if a conventional control method is used.

In addition to the above, the charge pump DC/DC converter circuit of the present embodiment may be arranged such that, a level of the drive voltage is changed so that on-resistance of said another one of the first semiconductor switches increases in proportion to a value which is worked out by subtracting a preset voltage from the potential difference detected by the second monitor circuit.

According to this arrangement, in a case where the second-stage capacitor is charged up to a voltage which is the sum of a voltage of the first-stage capacitor thus charged and the power supply voltage, the on-resistance of the semiconductor switch that turns on in the second period increase as the value worked out by subtracting the setting voltage from the potential difference between the terminals of the semiconductor switch that turns on in the second period increases. On this account, the increase in the on-resistance of the semiconductor switch is achieved by a simple arrangement, in addition to the effects above.

In addition to the above, the charge pump DC/DC converter circuit of the present embodiment may be arranged such that, the first-stage capacitor and the second-stage capacitor form a first capacitor pair, while another first-stage capacitor and the second-stage capacitor form a second capacitor pair, in the second period, first semiconductor switches on a charging path to said another first-stage capacitor of the second capacitor pair are turned on, so that said another first-stage capacitor is charged up to the power supply voltage, in the first period, the second-stage capacitor is charged up to a voltage which is sum of a voltage of said another first-stage capacitor thus charged and the power supply voltage, by turning on second semiconductor switches on a charging path to the second-stage capacitor, so that a voltage of a last-stage capacitor is outputted as the output voltage, the charge pump DC/DC converter circuit further including: a third monitor circuit which detects a potential difference between terminals of one of the first semiconductor switches turning on in the second period, so as to output a third determining signal corresponding to the detected potential difference; and a third drive circuit which outputs, in response to the third determining signal, a drive signal to at least one of the first semiconductor switches turning on in the second period, the drive signal increasing on-resistance of at least one of the first semiconductor switches turning on in the second period, in proportion to the detected potential difference.

According to the arrangement above, the second-stage capacitor of one capacitor pair functions as the second-stage capacitor of another capacitor pair.

In a case where only one capacitor pair is provided, the second-stage capacitor is, in a period, charged up to a voltage which is the sum of a voltage of the charged first-stage capacitor and the power supply voltage, but the second-stage capacitor is, in another period, not charged up to that voltage.

On the other hand, in a case where more than one capacitor pairs, e.g. two capacitor pairs, are provided, the second-stage capacitor of one capacitor pair is, in a period, charged up to a voltage which is the sum of a voltage of the charged first-stage capacitor and the power supply voltage, and that second-stage capacitor is, in another period, charged up to the voltage which is the sum of the voltage of the charged first-stage capacitor and the power supply voltage, by the other capacitor pair.

On this account, the second-stage capacitor is always charged up to the voltage which is the sum of the voltage of the charged first-stage capacitor and the power supply voltage. On this account, a simple arrangement makes it possible to always keep the second-stage capacitor to have a desired voltage, in addition to the effects above.

In addition to the above, the charge pump DC/DC converter circuit of the present embodiment may include n capacitor pairs each of which includes a first capacitor and a second capacitor, the second-stage capacitor functioning as the first capacitor of a first capacitor pair of the n capacitor pairs, and the second capacitor of each of the n capacitor pairs functioning as the first capacitor of a following capacitor pair, semiconductor switches on a charging path to the first capacitor of the following capacitor pair being turned on, so that the first capacitor of the following capacitor pair is charged up to a voltage which is (n+1) times as high as the power supply voltage, semiconductor switches on a charging path to the second capacitor of the following capacitor pair being turned on, so that the second capacitor of the following capacitor pair is charged up to a voltage which is (n+2) times as high as the power supply voltage, and hence a voltage of a last-stage capacitor being outputted as the output voltage, the charge pump DC/DC converter circuit further including: a fifth monitor circuit that detects a potential difference between terminals of one of the semiconductor switches on the charging path to the second capacitor of the following capacitor pair, so as to output a fifth determining signal corresponding to the detected potential difference; and a fifth drive circuit that outputs, in response to the fifth determining signal, a drive signal to at least one of the semiconductor switches on the charging path to the second capacitor of the following capacitor pair, the drive signal increasing on-resistance of at least one of the semiconductor switches on the charging path to the second capacitor of the following capacitor pair, in proportion to the detected potential difference.

According to the arrangement above, the second-stage capacitor of one capacitor pair functions as the first-stage capacitor of another capacitor pair. On this account, the final output is the sum of the result of the change in the first capacitor pair and the result of the charge in the second capacitor pair. It is therefore possible to obtain, by a simple arrangement, a desired voltage which is a result of integral multiplication, e.g. it is possible to obtain a voltage which is twice or three times as high as the power source voltage.

Note that, since the charge pump DC/DC converter circuit is a power supply circuit, not only the rush current and peak current but also a ripple on account of a load current must be reduced, in consideration of circuits connected to the charge pump DC/DC converter circuit. The ripple occurs on the output voltage of the charge pump DC/DC converter circuit.

For this reason, in addition to the above, the charge pump DC/DC converter circuit of the present embodiment preferably further includes an output voltage monitor circuit that causes a level of the output voltage in a predetermined period not to be higher than a predetermined level.

According to this arrangement, in the charge pump DC/DC converter circuit, the output voltage in a predetermined period is controlled so as to be always lower than the predetermined level. This makes it possible to eliminate redundant voltage increase of the output voltage in a predetermined period. In other words, the drop voltage on account of a load current in the predetermined period is reduced, and hence the drop voltage (ripple voltage) that occurs in the drive period on account of the load current is also reduced. As a result, the output ripple is reduced concurrently with the reduction of the rush current and peak current.

In addition to the above, the charge pump DC/DC converter circuit of the present embodiment may be arranged such that, the output voltage monitor circuit detects the output voltage, compares the detected output voltage with the predetermined level, generates, in accordance with a result of comparison, an output determining signal which is used for controlling the output voltage, generates a signal by adding the first determining signal to the output determining signal, and outputs the generated signal as another determining signal.

According to this arrangement, the output voltage monitor circuit reduces the output ripple simply by adding the determining signal for the reduction of the rush current and peak current to the output determining signal for the reduction of the output ripple. In other words, the operation of the output voltage monitor circuit is independent of the operation of the reduction of the rush current and peak current. On this account, no influence is exerted on a conventional control method.

Also, it is unnecessary to perform an additional complicated control for the reduction of the output ripple. (In other words, it is unnecessary to provide any additional circuit in the switch circuit that performs the charge pump of the charge pump DC/DC converter circuit.)

Furthermore, as described above, since the operation of the output voltage monitor circuit does not influence on the operation of the reduction of the rush current and peak current and on the conventional control method, the ripple voltage is not influenced by the setting voltage value which is used for the reduction of the rush current and peak current and by the timing to perform the circuit control. It is therefore possible to construct a charge pump DC/DC converter circuit in which the design-time setting of a ripple is easily done.

In addition to the above, the charge pump DC/DC converter circuit of the present embodiment may be arranged such that, the predetermined level is not higher than a maximum output voltage of the charge pump DC/DC converter circuit.

According to this arrangement, the predetermined level can be optionally determined on condition that the level is not higher than the maximum output voltage of the charge pump DC/DC converter circuit. It is therefore possible to obtain a desired output with a reduced output ripple, by appropriately setting the output ripple.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A charge pump DC/DC converter circuit, in which,
   in a first period of charge pump, a first-stage capacitor is charged up to a power supply voltage by turning on first semiconductor switches on a charging path to the first-stage capacitor, and
   in a second period, of the charge pump, which is subsequent to the first period, a second-stage capacitor is charged up to a voltage which is sum of a voltage of the first-stage capacitor thus charged and the power supply voltage, by turning on second semiconductor switches on a charging path to the second-stage capacitor, so that a voltage of a last-stage capacitor is outputted as an output voltage,
   the charge pump DC/DC converter circuit comprising:
   a first monitor circuit which detects a potential difference between terminals of one of the first semiconductor switches turning on in the first period, so as to output a first determining signal corresponding to the detected potential difference; and
   a first drive circuit which outputs a drive signal to at least one of the first semiconductor switches in response to the first determining signal, the drive signal increasing on-resistance of at least one of the first semiconductor switches in proportion to the detected potential difference.

2. The charge pump DC/DC converter circuit as defined in claim 1,
   wherein,
   a level of the drive signal is changed so that the on-resistance of said at least one first semiconductor switches increases in proportion to a value which is worked out by subtracting a preset voltage from the detected potential difference.

3. The charge pump DC/DC converter circuit as defined in claim 1,
   wherein,
   in a case where the first-stage capacitor is charged up to the power supply voltage,
   the first monitor circuit detects a potential difference between the terminals of one of the first semiconductor switches that turns on/off a path from a power source to the first-stage capacitor, so as to output the first determining signal corresponding to the detected potential difference, and
   the first drive circuit outputs, in response to the first determining signal, a drive signal to another one of the first semiconductor switches that turns on/off a path from the first-stage capacitor to a GND, the drive signal increasing on-resistance of said another one of the semiconductor switches in proportion to the detected potential difference.

4. The charge pump DC/DC converter circuit as defined in claim 1, further comprising:
   a second monitor circuit which detects a potential difference between terminals of one of the second semiconductor switches that turns on/off a path from the first-stage capacitor to the second-stage capacitor, so as to output a second determining signal corresponding to the detected potential difference, in a case where the second-stage capacitor is charged up to a voltage which is sum of a voltage of the first-stage capacitor thus charged and the power supply voltage; and a second drive circuit that outputs, in response to the second determining signal, a drive signal to another one of the second semiconductor switches that turns on/off a path from a power source to the first-stage capacitor, the drive signal increasing on-resistance of said another one of the second semiconductor switches in proportion to the detected potential difference.

5. The charge pump DC/DC converter circuit as defined in claim 3, further comprising:

a second monitor circuit which detects a potential difference between terminals of one of the second semiconductor switches which turns on/off a path from the first-stage capacitor to the second-stage capacitor, so as to output a second determining signal corresponding to the detected potential difference, in a case where the second-stage capacitor is charged up to a voltage which is sum of a voltage of the first-stage capacitor thus charged and the power supply voltage; and a second drive circuit that outputs, in response to the second determining signal, a drive signal to another one of the second semiconductor switches that turns on/off a path from a power source to the first-stage capacitor, the drive signal increasing on-resistance of said another one of the second semiconductor switches in proportion to the detected potential difference.

6. The charge pump DC/DC converter circuit as defined in claim 4, wherein, a level of the drive voltage is changed so that on-resistance of said another one of the first semiconductor switches increases in proportion to a value which is worked out by subtracting a preset voltage from the potential difference detected by the second monitor circuit.

7. The charge pump DC/DC converter circuit as defined in claim 1, in which, the first-stage capacitor and the second-stage capacitor form a first capacitor pair, while another first-stage capacitor and the second-stage capacitor form a second capacitor pair, in the second period, first semiconductor switches on a charging path to said another first-stage capacitor of the second capacitor pair are turned on, so that said another first-stage capacitor is charged up to the power supply voltage, in the first period, the second-stage capacitor is charged up to a voltage which is sum of a voltage of said another first-stage capacitor thus charged and the power supply voltage, by turning on second semiconductor switches on a charging path to the second-stage capacitor, so that a voltage of a last-stage capacitor is outputted as the output voltage, the charge pump DC/DC converter circuit further comprising:

a third monitor circuit which detects a potential difference between terminals of one of the first semiconductor switches turning on in the second period, so as to output a third determining signal corresponding to the detected potential difference; and a third drive circuit which outputs, in response to the third determining signal, a drive signal to at least one of the first semiconductor switches turning on in the second period, the drive signal increasing on-resistance of at least one of the first semiconductor switches turning on in the second period, in proportion to the detected potential difference.

8. The charge pump DC/DC converter circuit as defined in claim 4, in which, the first-stage capacitor and the second-stage capacitor form a first capacitor pair, while another first-stage capacitor and the second-stage capacitor form a second capacitor pair, in the second period, first semiconductor switches on a path to said another first-stage capacitor of the second capacitor pair are turned on, so that said another first-stage capacitor is charged up to the power supply voltage, in the first period, the second-stage capacitor is charged up to a voltage which is sum of a voltage of said another first-stage capacitor thus charged and the power supply voltage, by turning on second semiconductor switches on a path to the second-stage capacitor, so that a voltage of a last-stage capacitor is outputted as the output voltage, the charge pump DC/DC converter circuit further comprising:

a third monitor circuit which detects a potential difference between terminals of one of the first semiconductor switches turning on in the second period, so as to output a third determining signal corresponding to the detected potential difference;

a third drive circuit which outputs, in response to the third determining signal, a drive signal to at least one of the first semiconductor switches turning on in the second period, the drive signal increasing on-resistance of at least one of the first semiconductor switches turning on in the second period, in proportion to the detected potential difference;

a fourth monitor circuit which detects a potential difference between terminals of one of the second semiconductor switches turning on in the first period, so as to output a fourth determining signal corresponding to the detected potential difference; and a fourth drive circuit which outputs, in response to the fourth determining signal, a drive signal to at least one of the second semiconductor switches turning on in the first period, the drive signal increasing on-resistance of at least one of the second semiconductor switches turning on in the first period, in proportion to the detected potential difference.

9. The charge pump DC/DC converter circuit as defined in claim 1, comprising n capacitor pairs each of which includes a first capacitor and a second capacitor, the second-stage capacitor functioning as the first capacitor of a first capacitor pair of the n capacitor pairs, and the second capacitor of each of the n capacitor pairs functioning as the first capacitor of a following capacitor pair, semiconductor switches on a charging path to the first capacitor of the following capacitor pair being turned on, so that the first capacitor of the following capacitor pair is charged up to a voltage which is (n+1) times as high as the power supply voltage, semiconductor switches on a charging path to the second capacitor of the following capacitor pair being turned on, so that the second capacitor of the following capacitor pair is charged up to a voltage which is (n+2)

times as high as the power supply voltage, and hence a voltage of a last-stage capacitor being outputted as the output voltage, the charge pump DC/DC converter circuit further comprising:

a fifth monitor circuit that detects a potential difference between terminals of one of the semiconductor switches on the charging path to the second capacitor of the following capacitor pair, so as to output a fifth determining signal corresponding to the detected potential difference; and a fifth drive circuit that outputs, in response to the fifth determining signal, a drive signal to at least one of the semiconductor switches on the charging path to the second capacitor of the following capacitor pair, the drive signal increasing on-resistance of at least one of the semiconductor switches on the charging path to the second capacitor of the following capacitor pair, in proportion to the detected potential difference.

10. The charge pump DC/DC converter circuit as defined in claim 4, comprising n capacitor pairs each of which includes a first capacitor and a second capacitor, the second-stage capacitor functioning as the first capacitor of a first capacitor pair of the n capacitor pairs, and the second capacitor of each of the n capacitor pairs functioning as the first capacitor of a following capacitor pair, semiconductor switches on a charging path to the first capacitor of the following capacitor pair being turned on, so that the first capacitor of the following capacitor pair is charged up to a voltage which is (n+1) times as high as the power supply voltage, semiconductor switches on a charging path to the second capacitor of the following capacitor pair being turned on, so that the second capacitor of the following capacitor pair is charged up to a voltage which is (n+2) times as high as the power supply voltage, and hence a voltage of a last-stage capacitor being outputted as the output voltage, the charge pump DC/DC converter circuit further comprising:

a fifth monitor circuit that detects a potential difference between terminals of one of the semiconductor switches on the charging path to the second capacitor of the following capacitor pair, so as to output a fifth determining signal corresponding to the detected potential difference; and a fifth drive circuit that outputs, in response to the fifth determining signal, a drive signal to at least one of the semiconductor switches on the charging path to the second capacitor of the following capacitor pair, the drive signal increasing on-resistance of at least one of the semiconductor switches on the charging path to the second capacitor of the following capacitor pair, in proportion to the detected potential difference.

11. The charge pump DC/DC converter circuit as defined in claim 1, further comprising an output voltage monitor circuit that causes a level of the output voltage in a predetermined period not to be higher than a predetermined level.

12. The charge pump DC/DC converter circuit as defined in claim 7, further comprising an output voltage monitor circuit that causes a level of the output voltage a predetermined period not to be higher than a predetermined level.

13. The charge pump DC/DC converter circuit as defined in claim 8, further comprising an output voltage monitor circuit that causes a level of the output voltage a predetermined period not to be higher than a predetermined level.

14. The charge pump DC/DC converter circuit as defined in claim 9, further comprising an output voltage monitor circuit that causes a level of the output voltage a predetermined period not to be higher than a predetermined level.

15. The charge pump DC/DC converter circuit as defined in claim 10, further comprising an output voltage monitor circuit that causes a level of the output voltage a predetermined period not to be higher than a predetermined level.

16. The charge pump DC/DC converter circuit as defined in claim 11, wherein, the output voltage monitor circuit detects the output voltage, compares the detected output voltage with the predetermined level, generates, in accordance with a result of comparison, an output determining signal which is used for controlling the output voltage, generates a signal by adding the first determining signal to the output determining signal, and outputs the generated signal as another determining signal.

17. The charge pump DC/DC converter circuit as defined in claim 11, wherein, the predetermined level is not higher than a maximum output voltage of the charge pump DC/DC converter circuit.

* * * * *